(12) United States Patent
Grigore

(10) Patent No.: US 12,468,557 B2
(45) Date of Patent: Nov. 11, 2025

(54) WEB-BASED ROBOTIC PROCESS AUTOMATION DESIGNER SYSTEMS AND AUTOMATIONS FOR VIRTUAL MACHINES, SESSIONS, AND CONTAINERS

(71) Applicant: UiPath, Inc., New York, NY (US)

(72) Inventor: Mircea Grigore, Bucharest (RO)

(73) Assignee: UiPath, Inc., New York, NY (US)

( * ) Notice: Subject to any disclaimer, the term of this patent is extended or adjusted under 35 U.S.C. 154(b) by 624 days.

(21) Appl. No.: 17/341,534

(22) Filed: Jun. 8, 2021

(65) Prior Publication Data
US 2022/0391226 A1 Dec. 8, 2022

Related U.S. Application Data

(63) Continuation of application No. 17/340,603, filed on Jun. 7, 2021, now Pat. No. 12,067,407.

(51) Int. Cl.
*G06F 9/451* (2018.01)
*G06F 8/35* (2018.01)
(Continued)

(52) U.S. Cl.
CPC ............. *G06F 9/451* (2018.02); *G06F 8/35* (2013.01); *G06F 9/45558* (2013.01);
(Continued)

(58) Field of Classification Search
CPC ...... G06F 9/451; G06F 9/45558; G06F 16/95; G06F 8/35; G06F 2009/45591; G06F 2009/45595; G06Q 10/06316
(Continued)

(56) References Cited

U.S. PATENT DOCUMENTS 5,754,857 A * 5/1998 Gadol ................... G06Q 10/10
709/226
7,921,372 B2 4/2011 Sauve et al.
(Continued)

FOREIGN PATENT DOCUMENTS

CN 111813516 A 10/2020
CN 112486073 A 3/2021
(Continued)

OTHER PUBLICATIONS

AssistEdge Cloud RPA page available at https://www.edgeverve.com/assistedge/assistedge-cloud-rpa/ (last accessed Apr. 12, 2021).
(Continued)

*Primary Examiner* — Bradford F Wheaton
(74) *Attorney, Agent, or Firm* — LeonardPatel PC; Michael A. Leonard, II; Sheetal S. Patel

(57) ABSTRACT

Web-based robotic process automation (RPA) designer systems that allow RPA developers to design and implement web serverless automations, user interface (UI) automations, and other automations are disclosed. Such web-based RPA designer systems may allow a developer to sign in through the cloud and obtain a list of template projects, developer-designed projects, services, activities, etc. Thus, RPA development may be centralized and cloud-based, reducing the local processing and memory requirements on a user's computing system and centralizing RPA designer functionality, enabling better compliance. Automations generated by the web-based RPA designer systems may be deployed and executed in virtual machines (VMs), containers, or operating system sessions.

30 Claims, 18 Drawing Sheets

(51) Int. Cl.
  *G06F 9/455* (2018.01)
  *G06F 16/95* (2019.01)
  *G06Q 10/0631* (2023.01)

(52) U.S. Cl.
  CPC ....... *G06F 16/95* (2019.01); *G06Q 10/06316* (2013.01); *G06F 2009/45591* (2013.01); *G06F 2009/45595* (2013.01)

(58) Field of Classification Search
  USPC .......................................................... 717/106
  See application file for complete search history.

(56) References Cited

U.S. PATENT DOCUMENTS

| | | | |
|---|---|---|---|
| 8,170,901 B2 | 5/2012 | Shukla et al. | |
| 9,081,595 B1 | 7/2015 | Delarue et al. | |
| 9,135,151 B2 | 9/2015 | Betak et al. | |
| 9,905,266 B1* | 2/2018 | Yen | G06V 20/30 |
| 10,846,153 B2 | 11/2020 | Balasubramanian et al. | |
| 10,958,732 B1 | 3/2021 | Procopio | |
| 11,100,922 B1 | 8/2021 | Mutagi et al. | |
| 11,215,961 B2* | 1/2022 | Mehrotra | G05B 19/0426 |
| 11,301,224 B1 | 4/2022 | Dabhi et al. | |
| 2004/0107415 A1* | 6/2004 | Melamed | G06F 11/3684 717/124 |
| 2006/0069605 A1* | 3/2006 | Hatoun | G06Q 10/0633 705/7.26 |
| 2006/0155740 A1 | 7/2006 | Chen et al. | |
| 2007/0006153 A1 | 1/2007 | Sultan | |
| 2007/0150805 A1* | 6/2007 | Misovski | G06F 8/38 715/234 |
| 2008/0195936 A1* | 8/2008 | White | G06F 9/451 715/764 |
| 2011/0028145 A1 | 2/2011 | Marsyla et al. | |
| 2011/0040824 A1 | 2/2011 | Harm | |
| 2015/0012919 A1 | 1/2015 | Moss et al. | |
| 2015/0082197 A1 | 3/2015 | Pearl et al. | |
| 2017/0177171 A1 | 6/2017 | Won | |
| 2017/0220453 A1 | 8/2017 | Simons et al. | |
| 2018/0074931 A1* | 3/2018 | Garcia | G06F 11/3414 |
| 2019/0302981 A1* | 10/2019 | Storr | G06F 3/0481 |
| 2019/0303585 A1* | 10/2019 | Ofek | G06F 21/577 |
| 2020/0034119 A1* | 1/2020 | McLaughlin | G06F 40/14 |
| 2020/0034399 A1 | 1/2020 | Beno et al. | |
| 2020/0050529 A1 | 2/2020 | Balasubramanian et al. | |
| 2020/0192975 A1* | 6/2020 | Maes | H04L 67/10 |
| 2020/0233707 A1 | 7/2020 | Ramamurthy et al. | |
| 2020/0302542 A1* | 9/2020 | Yelovitch | G06Q 40/08 |
| 2020/0348964 A1 | 11/2020 | Anand et al. | |
| 2021/0042104 A1 | 2/2021 | Tashkandi | |
| 2021/0063986 A1 | 3/2021 | Mehrotra et al. | |
| 2021/0089358 A1 | 3/2021 | Yeung-Rhee et al. | |
| 2021/0109767 A1 | 4/2021 | Cohen et al. | |
| 2021/0117895 A1 | 4/2021 | Tondevold et al. | |
| 2021/0129325 A1 | 5/2021 | Yu et al. | |
| 2021/0294732 A1 | 9/2021 | Underseth | |
| 2022/0027806 A1* | 1/2022 | Burman | G06Q 10/06316 |
| 2022/0107622 A1 | 4/2022 | Monakova | |
| 2022/0150106 A1 | 5/2022 | McTaggart et al. | |
| 2022/0237005 A1 | 7/2022 | Mayer et al. | |

FOREIGN PATENT DOCUMENTS

| | | |
|---|---|---|
| JP | 2021060936 A | 4/2021 |
| JP | 2021072097 A | 5/2021 |
| WO | 2021071605 A1 | 4/2021 |

OTHER PUBLICATIONS

Automation 360 Platform page available at https://www.automationanywhere.com/products/automation-360 (last accessed Apr. 12, 2021).
SAP Intelligent RPA Cloud Studio User Guide Overview available at https://help.sap.com/viewer/8e71b41b9ea043c8bccee01a10d6ba72/Cloud/en-US (last accessed Apr. 12, 2021).
Bradford F Wheaton, "Non-Final Office Action", issued Sep. 16, 2022, U.S. Appl. No. 17/340,603.
Kofax, "More Choice, More Value: User Containers to Run Your Kofax Intelligent Automation Project", 2020.
Liang Y Li, "Non-Final Office Action", issued Jul. 22, 2022, U.S. Appl. No. 17/341,512.
Dewar, Craig, "Upgrades for All User Experiences from Everyday Business Users to Professional Developers", UiPath Blog, May 20, 2021, pp. 2-10 https://www.uipath.com/blog/product-and-updates/upgraded-automation-user-experiences-across-organization.
International Search Report & Written Opinion, issued Feb. 23, 2022, PCT Application No. PCT/US21/56929.
International Search Report & Written Opinion, issued Feb. 23, 2022, PCT Application No. PCT/US21/56933.
International Search Report & Written Opinion, issued Feb. 25, 2022, PCT Application No. PCT/US21/57166.
International Search Report & Written Opinion, issued Mar. 2, 2022, PCT Application No. PCT/US21/56926.
Osmundsen, et al., "Organizing Robotic Process Automation: Balancing Loose and Tight Coupling", Proceedings of the 52nd Hawaii International Conference on System Sciences, 2019.
Scott, et al., "freedom.js: an Architecture for Serverless Web Applications", University of Washington, 2013.
Scott, et al., "freedom.js: an Architecture for Serverless Web Applications", UW Technical Report, May 3, 2013, pp. 1, 9, 13; https:norfolk.cs.washington.edu/htbin-post/unrestricted/tr/list.cgi?sortby+date.
Bradford F Wheaton, "Advisory Action", issued May 10, 2023, U.S. Appl. No. 17/340,603.
Bradford F Wheaton, "Final Office Action", issued Feb. 17, 2023, U.S. Appl. No. 17/341,550.
Liang Y Li, "Non-Final Office Action", issued Mar. 31, 2023, U.S. Appl. No. 17/341,512.
Bradford F Wheaton, "Final Office Action", issued Feb. 3, 2023, U.S. Appl. No. 17/340,603.
Bradford F Wheaton, "Non-Final Office Action", issued Nov. 28, 2022, U.S. Appl. No. 17/341,550.
Liang Y Li, "Final Office Action", issued Jan. 9, 2023, U.S. Appl. No. 17/341,512.
"Test Automation Best Practice #4: Use Reliable Locators," May 11, 2018 (May 11, 2018), pp. 1-8, XP093063651, available at https://www.ranorex.com/blog/best-practices-4-use-stable-locators/.
Clay Smith, "Running Selenium and Headless Chrome on AWS Lambda," Jul. 28, 2017 (Jul. 28, 2017), pp. 1-4, XP093061597, available at https://medium.com/clog/running-selenium-and-headless-chrome-on-aws-lambda-fb350458e4df.
Himanshu Sheth, "Page Object Model (POM) In Selenium Python," Mar. 11, 2021 (Mar. 11, 2021), pp. 1-24, XP093063658, available at https://www.lambdatest.com/blog/page-object-model-in-selenium-python/.
Himanshu Sheth, "Robot Framework Tutorial with Selenium and Python," Sep. 16, 2020 (Sep. 16, 2020), pp. 1-23, XP093063203, Lambdatest Website, available at https://www.lambdatest.com/blog/robotframework-tutorial/.
Juho Saarinen, "Talk: RPA and automated testing with Robot Framework in Google App Engine," Mar. 24, 2020 (Mar. 24, 2020), p. 1, XP093063327, available at https://helsinki.serverlessdays.io/speakers/juho/.
Kim Schiller, "Why you should care about Robot Framework—Part II," Oct. 21, 2020 (Oct. 21, 2020), pp. 1-11, XP093063183, https://www.linkedin.com/pulse/why-you-should-care-robot-framework-part-ii-kim-schiller?trk=article-ssr-frontend-pulse_more-articles_related-content-card.
Nishant Choudhary, "How to Switch Tabs in a Browser Using Selenium Python?," Dec. 23, 2020 (Dec. 23, 2020), pp. 1-26, XP093061612, available at https://www.lambdatest.com/blog/python-selenium-switch-tabs/.
Olawepo Olayemi, "Browsers in containers—executing robot framework tests with selenoid (Part 2)," Nov. 30, 2019 (Nov. 30, 2019),

(56) References Cited

OTHER PUBLICATIONS pp. 1-3, XP093063190, https://sejuba.medium.com/browsers-incontainers-executing-robot-framework-tests-with-selenoid-part-2-2ca76059d24e.
Prakash Palanisamy, "Serverless UI testing using Selenium, AWS Lambda, AWS Fargate, and AWS Developer Tools," Mar. 29, 2021 (Mar. 29, 2021), pp. 1-11, XP093061943, available at https://aws.amazon.com/blogs/devops/serverless-ui-testing-using-selenium-aws-lambda-aws-fargate-and-aws-developer-tools/.
Selenium (software) Wikipedia Article, Mar. 29, 2021 (Mar. 29, 2021), pp. 1-5, XP093061578, available at https://en.wikipedia.org/w/index.php?title=Selenium_(software)&oldid=1014905597.
Supplementary European Search Report issued in EP Application No. 21820858.5 on Jul. 25, 2023.
Supplementary European Search Report issued in EP Application No. 21820860.1 on Jul. 24, 2023.
Supplementary European Search Report issued in EP Application No. 21820887.4 on Jul. 25, 2023.
Supplementary European Search Report issued in EP Application No. 21820893.2 on Jul. 24, 2023.
Wikipedia AWS Lambda Page, Jun. 3, 2021 (Jun. 3, 2021), pp. 1-3, XP093061929, available at https://en.wikipedia.org/w/index.php?title=AWS_Lambda&oldid=1026717460.
Wikipedia Integrated Development Environment Article, May 28, 2021 (May 28, 2021), pp. 1-4, XP093063760, available at https://en.wikipedia.org/w/index.php?title=Integrated_development_environment&oldid=1025557270.
Wikipedia Static Program Analysis Article, Mar. 14, 2021 (Mar. 14, 2021), pp. 1-4, XP093063980,DOI: 10.1049/sej. 1995.0010, available at https://en.wikipedia.org/w/index.php?title=Static_program_analysis&oldid=1012093289.
U.S. Appl. No. 17/341,512—Final Office Action mailed on Dec. 5, 2023, 19 pages.
Office Action issued in Korean Application No. 10-2021-7043185 on Feb. 28, 2024.
Office Action issued in Korean Application No. 10-2021-7043188 on Mar. 19, 2024.
Bradford F Wheaton, "Non-Final Office Action", issued Oct. 10, 2023, U.S. Appl. No. 17/340,603.
Bradford F Wheaton, "Notice of Allowance", issued Aug. 3, 2023, U.S. Appl. No. 17/341,550.
Bradford F Wheaton, "Notice of Allowance", issued Apr. 24, 2024, U.S. Appl. No. 17/340,603.
Notice of Allowance, issued Dec. 3, 2024, Korean Patent Application No. 10-2021-7043188.
Notice of Allowance, issued Dec. 6, 2024, KR Patent Application No. 10-2021-7043170.
Office Action, issued Oct. 31, 2024, Korean Patent Application No. 10-2021-7043185.
Office Action, issued Sep. 25, 2024, KR Patent Application No. 10-2021-7043170.
Examination Report, issued Aug. 7, 2024, EP Patent Application No. 21820858.5.
Examination Report, issued Aug. 7, 2024, EP Patent Application No. 21820860.1.
Examination Report, issued Aug. 7, 2024, EP Patent Application No. 21820887.4.
Examination Report, issued Aug. 7, 2024, EP Patent Application No. 21820893.2.
Wikipedia, "Remote Procedure Call", May 1, 2021, https://en.wikipedia.org/w/index.php?title=remote_procedure_call&oldid=1020915529.
Liang Y Li, "Non-Final Office Action", issued Aug. 15, 2024, U.S. Appl. No. 17/341,512.
U I. Vision webpage. Retrieved May 6, 2021. , (Year: 2021).
UI.Vision. "Visual UI Testing with the UI Vision RPA Software". Jul. 23, 2018. ( Year: 2018).
Lambdatest, Next-Gen App & Browser Testing Cloud.
Office Action, issued Jan. 14, 2025, KR Patent Application No. 10-2021-7043179.
Scott, et al., "freedom.js: an Architecture for Serverless Web Applications", 2013.
Liang Y Li, "Final Office Action", issued Feb. 25, 2025, U.S. Appl. No. 17/341,512.
Office Action, issued Jun. 24, 2025, JP Patent Application No. 2021-577299.

\* cited by examiner

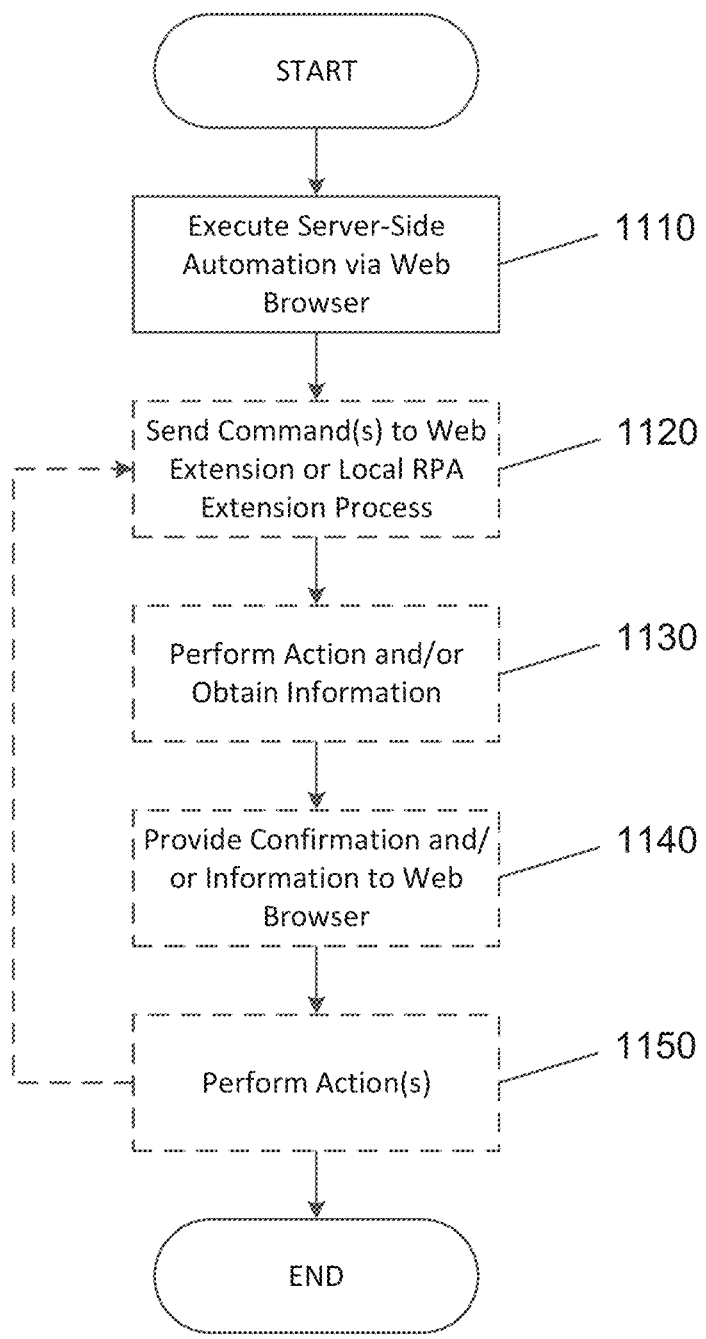

WEB-BASED ROBOTIC PROCESS AUTOMATION DESIGNER SYSTEMS AND AUTOMATIONS FOR VIRTUAL MACHINES, SESSIONS, AND CONTAINERS

CROSS REFERENCE TO RELATED APPLICATION

This application is a continuation of, and claims the benefit of, U.S. patent application Ser. No. 17/340,603 filed Jun. 7, 2021. The subject matter of this earlier filed application is hereby incorporated by reference in its entirety.

FIELD

The present invention generally relates to robotic process automation (RPA), and more specifically, to web-based RPA designer systems that allow RPA developers to design and implement web serverless automations, user interface (UI) automations, and other automations.

BACKGROUND

Policies of many organizations do not allow installing of additional software or upgrading of existing software by employees directly on their own computing systems. Such policies may be in place to attempt to ensure compliance with laws or agreements in the U.S. and other countries, such as the E.U. General Data Protection Regulation (GDPR), the U.S. Health Insurance Portability and Accountability Act (HIPAA), third-party terms of service, etc. Current RPA development software exists as a desktop tool residing locally on a user's computing system, which may require new versions or capabilities for the software to be tested by IT and reviewed by compliance officers before the new version or enhancement can be rolled out to users. Also, many new capabilities and services are cloud-based. Accordingly, an improved and/or alternative approach to RPA may be beneficial.

SUMMARY

Certain embodiments of the present invention may provide solutions to the problems and needs in the art that have not yet been fully identified, appreciated, or solved by current RPA technologies. For example, some embodiments of the present invention pertain to web-based RPA designer systems that allow RPA developers to design and implement web serverless automations, user interface (UI) automations, and other automations.

In an embodiment, a system includes a developer computing system including a web browser and a development server providing a web-based RPA designer application. The web browser is configured to access and display a web interface of the web-based RPA designer application. The web interface is configured to create RPA projects, configure RPA workflows, and submit the RPA workflow configurations to the web-based RPA designer application. The web-based RPA designer application is configured to provide the web interface to the web browser, generate an automation based on a submitted RPA workflow configuration from the web browser, execute the generated automation via an RPA robot and validate the generated automation, and provide results of the execution by the RPA robot and the validation of the generated automation to the web browser. The generated automation is configured to be executed by an RPA robot remotely in an operating system session, a VM, or a container.

In another embodiment, a non-transitory computer-readable medium stores a computer program for a web-based RPA designer application. The computer program is configured to cause at least one processor to provide a web interface to a web browser of a computing system. The web interface is configured to provide functionality to create RPA projects, configure RPA workflows, and submit the RPA workflow configurations to the web-based RPA designer application. The computer program is also configured to cause the at least one processor to generate an automation based on a submitted RPA workflow configuration from the web browser, execute the generated automation via an RPA robot, and validate the generated automation. The computer program is further configured to cause the at least one processor to provide results of the execution of the RPA robot and the validation of the generated automation to the web browser. The generated automation is configured to be executed by a production RPA robot at runtime remotely in an operating system session, a VM, or a container.

In yet another embodiment, a computer-implemented method for web-based RPA includes generating an automation based on a submitted RPA workflow configuration from a web browser, by a cloud-based computing system, executing the generated automation via an RPA robot, and validating the generated automation, by the cloud-based computing system. The computer-implemented method also includes providing results of the execution of the RPA robot and the validation of the generated automation to the web browser, by the cloud-based computing system. The generated automation is configured to be executed by a production RPA robot at runtime remotely in an operating system session, a VM, or a container.

In another embodiment, a cloud-based system includes memory storing computer program instructions and at least one processor configured to execute the computer program instructions. The computer program instructions are configured to cause the at least one processor to run a plurality of RPA robots as runtime services. The plurality of RPA robots are located in an operating system session, a VM, or a container of the cloud-based system. The computer program instructions are also configured to cause the at least one processor to execute automations, by the plurality of RPA robots. The plurality of automations are accessible by the plurality of RPA robots and located in the operating system session, the VM, or the container of the cloud-based production server or located remotely to the cloud-based system.

In yet another embodiment, a non-transitory computer-readable medium stores a computer program. The computer program is configured to cause at least one processor to run an RPA robot as a runtime service. The RPA robot is located in an operating system session, a VM, or a container. The computer program is also configured to cause the at least one processor to execute an automation, via the RPA robot. The automation is configured to cause the RPA robot to send one or more commands to a web extension of a web browser of a client computing system. The web extension is configured to interact with the web browser of the client computing system, obtain information from one or more webpages in one or more tabs of the web browser of the client computing system, or both. The web extension is also configured to provide confirmation that the requested interaction occurred, provide the obtained information, or both, to the RPA robot.

In still another embodiment, a computer-implemented method includes running an RPA robot as a runtime service, by a cloud-based computing system. The RPA robot is located in an operating system session, a VM, or a container of the computing system. The computer-implemented method also includes executing an automation, by the RPA robot. The automation is configured to cause the RPA robot to send one or more requests to a local RPA extension process of a client computing system. The local RPA extension process is configured to interact with one or more applications and/or processes of the client computing system, obtain information from the one or more applications and/or processes running on the client computing system, or both. The local RPA extension process is also configured to provide confirmation that the requested interaction occurred, provide the obtained information, or both, to the RPA robot.

In another embodiment, a system includes a developer computing system including a web browser and a development server providing a web-based RPA designer application. The web-based RPA designer application is configured to cause the web browser to download code for the web-based RPA designer application and display a web interface for the web-based RPA designer application in the web browser. The web interface is configured to provide functionality to create RPA projects and configure RPA workflows. The web-based RPA designer application is also configured to cause the web browser to generate an automation for a configured RPA workflow in the web browser and execute and validate the generated automation in the web browser.

In yet another embodiment, a non-transitory computer-readable medium stores a computer program. The computer program is configured to cause at least one processor to download code for a web-based RPA designer application to a web browser and display a web interface for the web-based RPA designer application in the web browser. The web interface is configured to provide functionality to create RPA projects and configure RPA workflows. The computer program is also configured to cause the at least one processor to generate an automation for a configured RPA workflow in the web browser and execute and validate the generated automation in the web browser.

In still another embodiment, a computer-implemented method includes downloading code for a web-based RPA designer application to a web browser, by a computing system. The computer-implemented method also includes displaying a web interface for the web-based RPA designer application in the web browser, by the computing system. The web interface is configured to provide functionality to create RPA projects and configure RPA workflows. The computer-implemented method further includes generating an automation for a configured RPA workflow in the web browser, by the computing system, and executing and validating the generated automation in the web browser, by the computing system. Code for executing and validating the generated automation is included in the downloaded code.

In another embodiment, a cloud-based system includes memory storing computer program instructions and at least one processor configured to execute the computer program instructions. The computer program instructions are configured to cause the at least one processor to run an automation in a first web browser at runtime. The first web browser is located in an operating system session, a VM, or a container of the cloud-based system.

In yet another embodiment, a non-transitory computer-readable medium stores a computer program. The computer program is configured to cause at least one processor to run an automation in a first web browser at runtime. The first web browser is located in an operating system session, a VM, or a container of the cloud-based system. The automation is configured to cause the RPA robot to send one or more commands to a web extension of a second web browser of a client computing system. The web extension is configured to interact with the second web browser of the client computing system, obtain information from one or more webpages in one or more tabs of the second web browser of the client computing system, or both. The web extension is also configured to provide confirmation that the requested interaction occurred, provide the obtained information, or both, to the first web browser.

In still another embodiment, a computer-implemented method includes running an automation in a web browser at runtime, by a computing system. The web browser is located in an operating system session, a VM, or a container of the cloud-based system. The automation is configured to cause the web browser to send one or more requests to a local RPA extension process of a client computing system. The local RPA extension process is configured to interact with one or more applications and/or processes of the client computing system, obtain information from the one or more applications and/or processes running on the client computing system, or both. The local RPA extension process is also configured to provide confirmation that the requested interaction occurred, provide the obtained information, or both, to the web browser.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 11 is a flowchart illustrating a process for executing an automation at runtime in a web browser of a container, VM, or operating system session, according to an embodiment of the present invention.

Unless otherwise indicated, similar reference characters denote corresponding features consistently throughout the attached drawings.

DETAILED DESCRIPTION OF THE EMBODIMENTS

Figure 1:
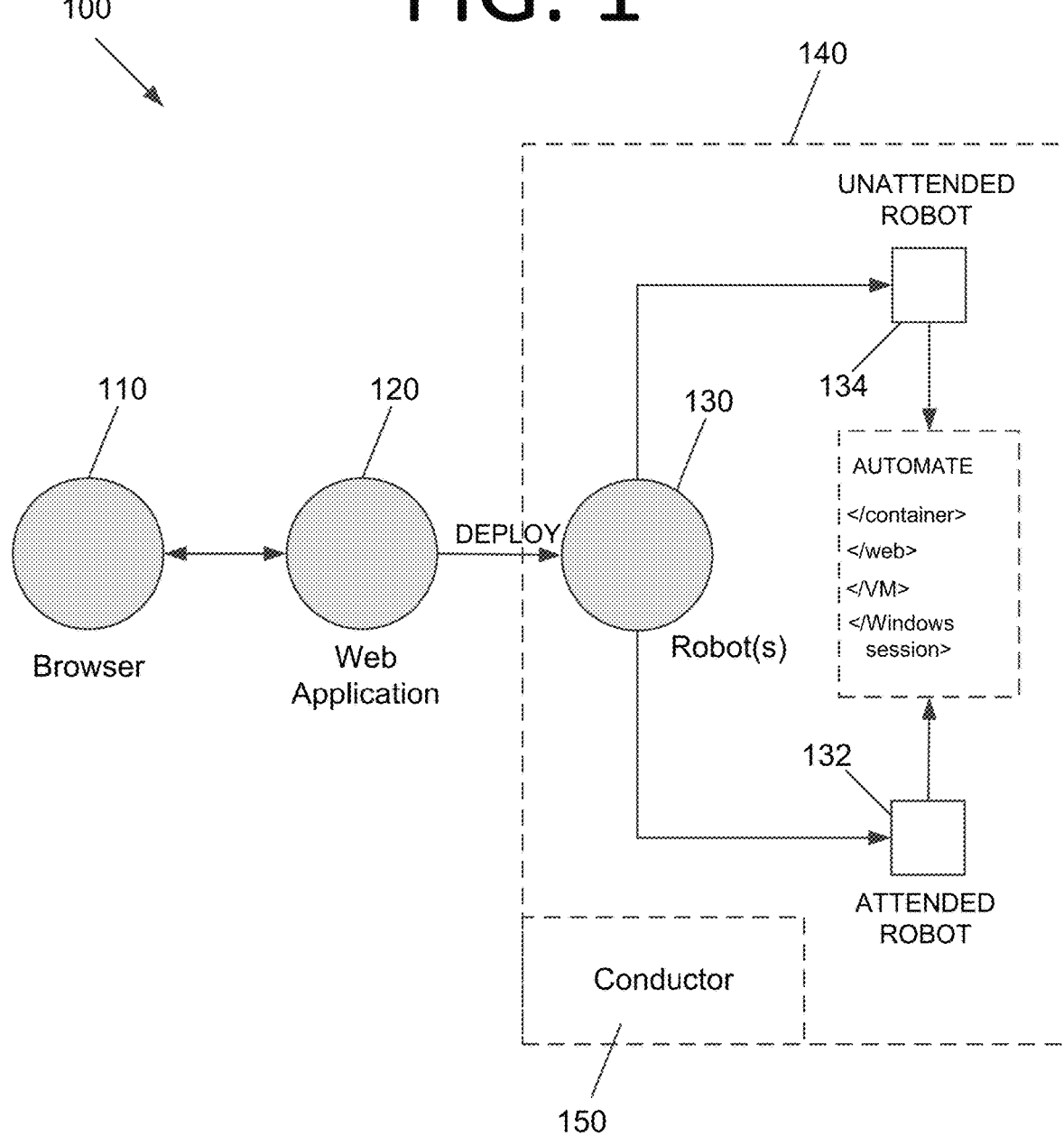
FIG. 1 is an architectural diagram illustrating a web-based RPA designer system, according to an embodiment of the present invention.

Some embodiments pertain to web-based RPA designer systems that allow RPA developers to design and implement web serverless automations, UI automations, and other automations. In some embodiments, the web-based RPA designer system, the automations generated by the system, or both, are provided in a cloud-based environment, for example. Such embodiments may not require desktop installation, and may allow a user to sign in through the cloud and obtain a list of template projects, developer-designed projects, services, activities, etc. Thus, RPA development may be centralized and cloud-based in some embodiments, reducing the local processing and memory requirements on a user's computing system and centralizing RPA designer functionality, enabling better compliance. Such embodiments may also enable the RPA service provider to maintain and upgrade the RPA designer system on their end, reducing maintenance issues and costs associated with upgrades and adding new functionality by customers. This may also enable faster and more regular updates, rollout of new features, bug fixes, etc.

In some embodiments, an RPA developer may access the cloud-based RPA designer system via a web browser. He or she may initially be greeted with a home page (see FIG. 7A, for example), from which projects can be created and information regarding what the user wants to build can be provided. A "canvas" webpage may then appear (see FIG. 7C, for example), on which the user can build the desired RPA automation. For instance, in some embodiments, the user can configure RPA activities in an RPA workflow and control how the automation will run (e.g., manually, based on a trigger, scheduled, etc.). After the RPA workflow is designed as intended, the user can publish the RPA workflow in some embodiments, and the automation can be deployed as desired.

In some embodiments, the web-based RPA designer system provides users with the ability to design, edit, and test server-side workflows, serverless workflows, long-running workflows (e.g., workflows that may wait for certain processes to complete or for certain input before resuming operation), orchestration processes, headless workflows, background processes, non-UI automation workflows, workflows that commonly do not require user interaction, etc. Serverless workflows created in a web-based RPA designer system, for example, may be saved to the cloud and users can manually run and debug server-side workflows via a web browser. The packages may be published to a cloud (e.g., a server-side) orchestrator and assistant. Projects may be compiled when published as packages.

The triggers in some embodiments are application programming interface (API) triggers. API triggers are program-to-program calls that may come from an application or operating system (OS) and may result from various user or software events, such as a user interacting with a user interface (e.g., clicking a button) or entering certain information, a notification that an email has been received, a graphical element appearing on a screen, a key being pressed, a file changing, an element attribute changing, an OS-level event, etc. Triggers may be implemented as classes with events being instances of the classes, and events can be detected via event listeners.

The web-based RPA designer system of some embodiments can develop UI automations that are configured to respond to at least two types of API triggers, such as push triggers and pull triggers. Pull triggers may run repeatedly (e.g., every time the OS cycles through processes that are looking for information, every second, every minute, every ten minutes, etc.) and check whether a change pertinent to that trigger has occurred, such as a flag indicating that a new email has been received, checking a value of a text field to see whether the text changed, etc. Push triggers are application-generated events (e.g., web hooks) that cause a listener to react when they are fired. This could also occur responsive to a new email being received, due to a request from a server, due to a user clicking a button, etc.

There is also a distinction between web triggers and "desktop" (local) triggers. Desktop triggers tend to be based on what is occurring on a user's computing system. Web triggers, on the other hand, occur on a web server and can be global. Multiple clients (e.g., two, ten, all, etc.) may receive the web trigger.

However, in some embodiments, UI automations may be built from a web interface on top of applications that exist on the web. For instance, if there is a tab on a webpage for Workday®, an RPA developer may use the cloud-based RPA designer system of some embodiments to interact with this page and create an automation on top of it. This automation may run server-side (e.g., in the cloud) and be executed in a virtual machine (VM), as is discussed in more detail later herein. Multiple VMs may run on a single server, and each VM typically has its own operating system and applications.

In some embodiments, for UI automations, a taxonomy of UI elements may be provided that allows a user to interact with buttons, text fields, etc. The taxonomy may be hierarchical and specify a relationship between the UI elements, such as which elements are located in which page and/or part of a page. For example, a user may select an OK button from the taxonomy and cause the automation to click that button.

In some embodiments, web-based UI automations are assisted by web browser extensions (e.g., a Google Chrome® extension, a plugin for another web browser, or any other suitable mechanism for extending the functionality of the web browser) that can be installed and communicate with tabs in the web browser to obtain information and implement UI automations locally. For instance, such extensions may be able to click on the browser, get text from browser elements, etc. and provide this information to an RPA robot. In some embodiments, the web browser and RPA designer application may both be located on the RPA developer's computing system. However, in certain embodiments, the web-based RPA designer application is located remotely and the RPA developer interacts with the web-based RPA designer application via the web browser. This may enable the web-based RPA designer application to be maintained and upgraded by the company that created the RPA designer application and automatically keep the application up-to-date.

At runtime, the extension may be located on the user's computing system and the automation code may be located remotely (e.g., on a server, in a cloud-based environment, etc.). An operating system session may exist on the user's local computing system where a web application is open and running. The UI automation, via the web extension, instructs the web application to perform the desired action. Per the above, in some embodiments, automations may run in a VM on a server and may not need to interact with a web browser extension on a user computing system to implement its functionality.

In some embodiments, a "headless browser" may be used, where an interactive session on Windows® or some other operating system is not required. Such a headless browser could run on any OS in some embodiments, such as in a Linux® container. Containers contain applications such that they are isolated from the host system on which they run. An automation together with the libraries and other dependencies it uses, could be packaged into the container. The automation may be designed with a web-based RPA designer system, but could then be called from an API and the call could be translated to a serverless session. As such, headless browser automations do not require an open web browser, an interactive session, and a Windows® VM, for example.

In some embodiments, a serverless session may be in a container, a VM, or a Windows® session, for example. As many serverless sessions may be run as the computing system can handle with its hardware resources. These serverless workflows may appear as running processes in the operating system, for example.

In order to design a UI automation for a headless browser, a design experience similar to a desktop RPA designer application may be provided, where user interactions with the web browser can be recorded and/or indicate on screen functionality, capture element functionality, etc. may be provided. The recorder may be located one level above the current browser tab that the user is interacting with. This could be implemented via a Chrome® extension or some other browser extension that gives access to the browser itself. The extension may interact with open tabs to design the UI automation (e.g., clicking elements, creating tables, etc.) for a loaded page at design time. Once published or otherwise made available for runtime use, the headless browser UI automation can be scheduled to be executed in a Linux® container, for example, rather than in a VM session. While this is called a "UI automation" here given how it is designed, no UI is actually displayed to a user when the headless browser UI automation runs.

The web-based RPA designer system of some embodiments allows users to build UI automations and other automations. As used herein, "automations" are the code that implements the RPA workflow logic, such as those developed by the web-based RPA designer system of some embodiments. The environment in which the automation runs may depend on what the automation does. If the automation is an attended automation that is intended to be visible performing UI interactions and/or asks a user for input, a VM with Windows® installed may be used so the UI automation can run successfully. However, if the UI automation does not need to be visible or ask for user input, such as headless browser automation, such an automation may be run in a Linux® container, for example. A web extension may be used for a web-based application where information is needed from an end user's computing system and the UI automation is headless. Otherwise, if desired, this functionality may be implemented by spinning up a VM.

VMs or Linux® containers are used in some embodiments when the RPA developer would like to create a UI automation or another automation and run it directly without installing and running the automation locally on the user's computing system. The actions that would otherwise occur on the user's computing system instead happen in the VM or container. In order to manage such VMs or containers, automatically or manually provisioned pools may be used. Automatically provisioned pools may be elastic and the number of VMs or containers in the pool may be increased or decreased depending on demand. Manually provisioned pools, on the other hand, may include the number of VMs or containers specified by a human (e.g., an administrator).

"Serverless" (unattended) automations do not need a typical server to run and may be run in a Linux® container, for example. Serverless automations developed using the web-based RPA designer system of some embodiments may be scheduled to run at certain times or otherwise run without user interactions. For instance, when a certain email is received, a message may be sent via Slack®. When a job fails on a conductor application, the job may be rerun, or if the job fails with a particular error, an email may be sent to an administrator instead of rerunning the job. Any suitable automations may be developed and implemented without deviating from the scope of the invention. UI automations may also be run at certain times or in response to user requests or actions.

In some embodiments, a dedicated set of UI activities is provided to automate web functionality. For instance, activities that recognize and interact with web components may be tailored to more accurately detect shapes and layouts that tend to be present in web applications, potentially taking into account visual differences between browsers.

In some embodiments, integration may be provided between the web-based RPA designer application and a desktop-based RPA designer application. For instance, project data for a given UI automation may be saved in a common format that both designer application versions can read, such as XAML. This may enable an RPA developer to work on a UI automation offline on his or her laptop while traveling, upload the project to the cloud when Internet access is available, and then continue working on the UI automation using a web browser. Data may also be synced between the web version and the desktop version of the designer application in some embodiments. Also, use of a web-based designer application may reduce the local memory footprint and processing requirements for each user, as well as facilitate design collaboration between multiple web users.

In some embodiments, the automation is designed and packaged to be executed by RPA robots executing in a VM, container, or operating system session without modifying the automation package for a specific platform. In other words, the same package can be run in a VMware® VM, a Linux® container, or a Windows® session, for example, without modifying the package. RPA robots may be designed for a specific target platform and deployed thereon, but a common format may be used for running automations. For instance, the workflow may be described in XAML or some other format that the RPA robots on each platform may be designed to read and execute in compiled machine code (e.g., digital link libraries (DLLs)). This may provide code obfuscation and security, as well as potentially make the automation run faster. However, in certain embodiments, the automation may be a script in XAML, XML, plain text, or some other suitable format.

FIG. 1 is an architectural diagram illustrating a web-based RPA designer system 100, according to an embodiment of the present invention. RPA system 100 includes a web browser 110 (e.g., running on an RPA developer's computing system) that allows a developer to design and implement RPA workflows via a cloud-based web application 120. Web browser 110, via web application 120, may provide a solution for application integration, as well as automating third-party applications, administrative Information Technology (IT) tasks, and business IT processes. Web browser 110 and web application 120 may facilitate development of an automation project, which includes a graphical representation of a process. Simply put, web browser 110 and web application 120 facilitate the development of RPA workflows and the deployment of automations that can be implemented by RPA robots running as services.

The automation project enables automation of rule-based processes by giving the RPA developer control of the execution order and the relationship between a custom set of steps developed in a workflow, defined herein as "activities." One commercial example of an embodiment of web application 120 is UiPath Studio Web™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in web browser 110, execution of the automation may be tested using web application 120. However, in some embodiments, web browser 110 includes the automation generating and testing functionality of web application 120. After an automation is functioning properly and ready for deployment on a production server 140, the automation is deployed to a container, a VM, or a server operating system session of production server 140 in the form of machine-readable code or a script. In some embodiments, robots 130 are orchestrated by conductor 150. RPA robots 130 may then execute the deployed automations as desired. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. For instance, attended robots 132 may perform UI automation, provide fillable forms, etc. Attended robots 132 may help the human user accomplish various tasks, and may be triggered by user events. In certain embodiments, attended robots 132 can only be started from a robot tray or from a command prompt. Attended robots 132 should run under human supervision in some embodiments.

Unattended robots 134 may run unattended in virtual environments, containers, or operating system sessions, and can automate many processes. Unattended robots 134 may be responsible for remote execution, monitoring, scheduling, and providing support for work queues, for instance. Debugging for all robot types may be run in web browser 110 and web application 120 in some embodiments. Both attended and unattended robots may automate various systems and applications including, but not limited to, mainframes, web applications, VMs, containers, enterprise applications (e.g., those produced by SAP®, SalesForce®, Oracle®, etc.), and computing system applications (e.g., desktop and laptop applications, mobile device applications, wearable computer applications, etc.).

Robots 130 are execution agents that run workflows built in web browser 110 via web application 120. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from web browser 110 and web application 120 may also be independent of browser zoom level in some embodiments. For applications that are DPI-unaware or intentionally marked as unaware, DPI may be disabled in some embodiments.

In some embodiments, conductor 150 may have various capabilities including, but not limited to, provisioning, deployment, configuration, queueing, monitoring, logging, and/or providing interconnectivity. In certain embodiments, conductor 150 may be deployed remotely to production server 140. Provisioning may include creating and maintenance of connections between robots 130 and conductor 150 (e.g., via a conductor web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 150 may provide interconnectivity by acting as the centralized point of communication for third-party solutions and/or applications. Conductor 150 may manage the infrastructure, which includes deployed robots and computing systems on which the deployed robots operate.

Figure 2:
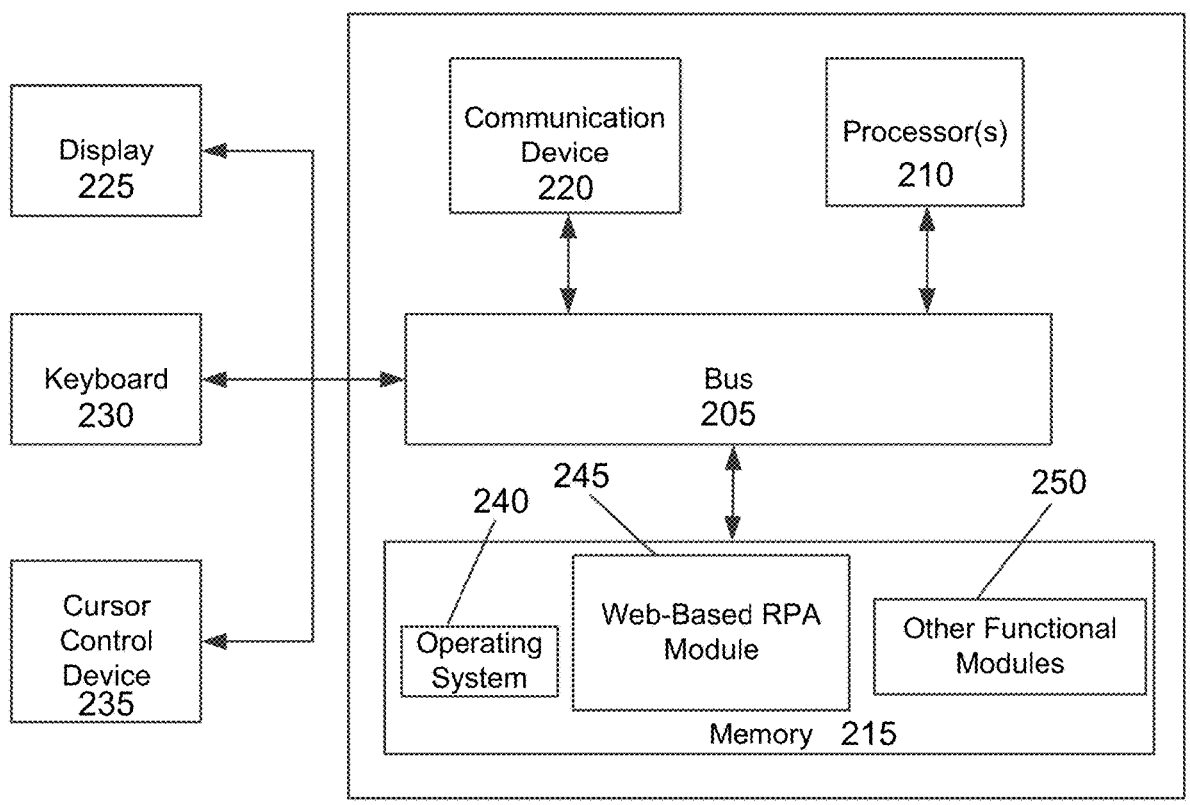
FIG. 2 is an architectural diagram illustrating a computing system configured to implement part or all of a web-based RPA designer system, according to an embodiment of the present invention.

FIG. 2 is an architectural diagram illustrating a computing system 200 configured to implement part or all of a web-based RPA designer system, according to an embodiment of the present invention. In some embodiments, computing system 200 may be one or more of the computing systems depicted and/or described herein. Computing system 200 includes a bus 205 or other communication mechanism for communicating information, and processor(s) 210 coupled to bus 205 for processing information. Processor(s) 210 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 210 may also have multiple processing cores, and at least some of the cores may be configured to perform specific functions. Multi-parallel processing may be used in some embodiments. In certain embodiments, at least one of processor(s) 210 may be a neuromorphic circuit that includes processing elements that mimic biological neurons. In some embodiments, neuromorphic circuits may not require the typical components of a Von Neumann computing architecture.

Computing system 200 further includes a memory 215 for storing information and instructions to be executed by processor(s) 210. Memory 215 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 210 and may include volatile media, non-volatile media, or both. The media may also be removable, non-removable, or both.

Additionally, computing system 200 includes a communication device 220, such as a transceiver, to provide access to a communications network via a wireless and/or wired connection. In some embodiments, communication device 220 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 220 may include one or more antennas that are singular, arrayed, phased, switched, beamforming, beamsteering, a combination thereof, and/or any other antenna configuration without deviating from the scope of the invention.

Processor(s) 210 are further coupled via bus 205 to a display 225, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 225 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 230 and a cursor control device 235, such as a computer mouse, a touchpad, etc., are further coupled to bus 205 to enable a user to interface with computing system 200. However, in certain embodiments, a physical keyboard and mouse may not be present, and the user may interact with the device solely through display 225 and/or a touchpad (not shown). Any type and combination of input devices may be used as a matter of design choice. In certain embodiments, no physical input device and/or display is present. For instance, the user may interact with computing system 200 remotely via another computing system in communication therewith, or computing system 200 may operate autonomously.

Memory 215 stores software modules that provide functionality when executed by processor(s) 210. The modules include an operating system 240 for computing system 200. The modules further include a web-based RPA module 245 that is configured to perform all or part of the processes described herein or derivatives thereof. Computing system 200 may include one or more additional functional modules 250 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 3A:
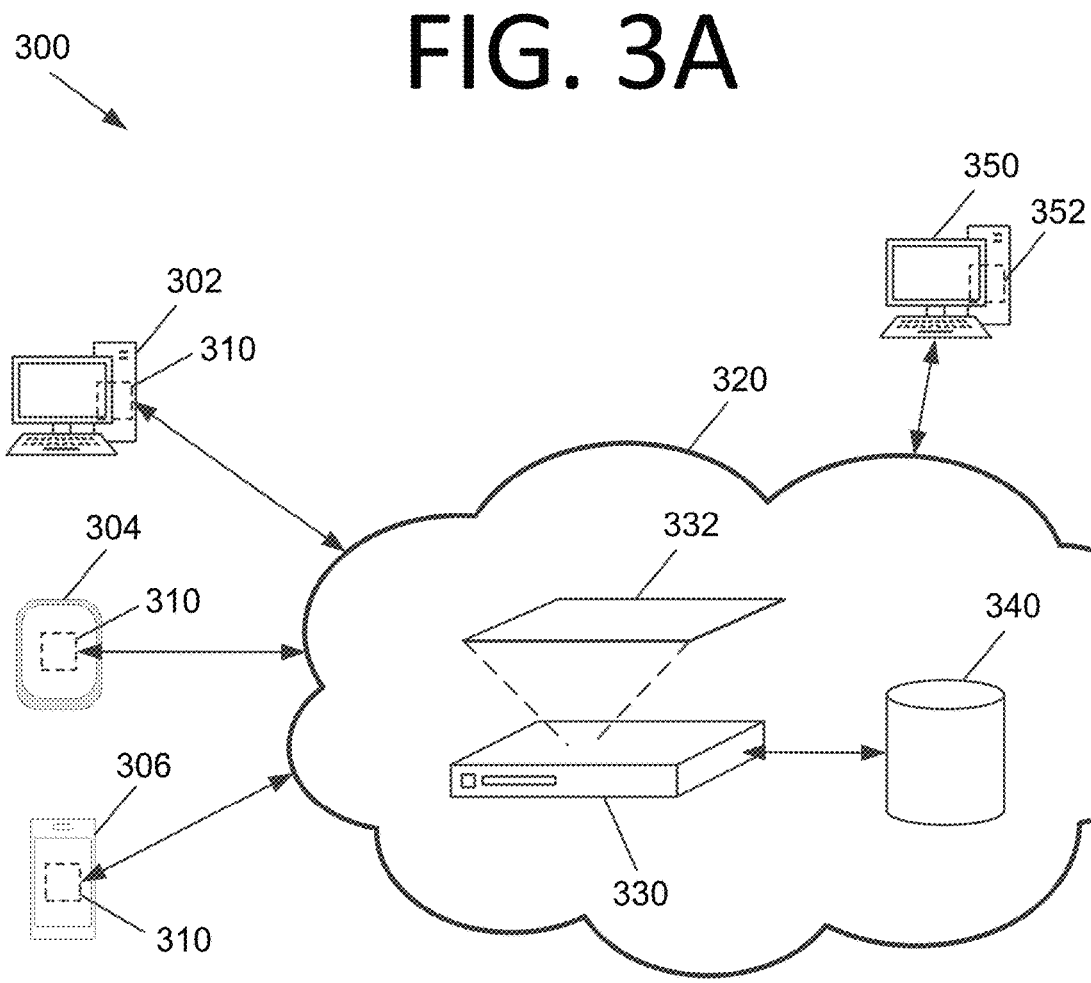
FIG. 3A is an architectural diagram illustrating a web-based RPA system, according to an embodiment of the present invention.

FIG. 3A is an architectural diagram illustrating a web-based RPA system 300, according to an embodiment of the present invention. System 300 includes user computing systems, such as desktop computer 302, tablet 304, and smart phone 306. However, any desired computing system may be used without deviating from the scope of invention including, but not limited to, smart watches, laptop computers, Internet-of-Things (IoT) devices, vehicle computing systems, etc.

Each computing system 302, 304, 306 has a web browser 310 installed thereon. Web browser 310 may include an extension that carries out the local part of a UI automation, such as performing mouse clicks, entering text into text fields, providing screenshots, providing information appearing in text fields or other components of the web page, etc. Such an extension may be useful for attended automations, for example. In certain embodiments, computing systems 302, 304, 306 may run RPA robots that have been developed using a web-based RPA designer system that retrieves elements for PowerPoint®, Outlook®, etc. from a UI object repository. See, for example, U.S. patent application Ser. No. 16/922,289. Elements for the target application (e.g., items within an object repository, such as applications, screens, and UI elements, where applications group screens and screens group UI elements) may be added to the workflow (e.g., by dragging-and-dropping elements into activities). Web browser 310 may be any desired type of web browser without deviating from the scope of the invention.

A UI object repository may include UI object libraries of UI objects that may be grouped by applications, application versions, application screens, collections of UI elements, a combination thereof, etc. The UI object repository of UI object libraries in some embodiments may facilitate the managing, reusing, and increasing the reliability of UI descriptors in a project. To make UI objects reusable, they may be extracted into UI object libraries that can be referenced by RPA processes. When selectors or other UI descriptors are modified due to a new version of an application, for example, the library may be recreated (or republished) to include the modified UI descriptors. RPA processes using the UI object library may then call the modified UI descriptor versions.

UI descriptors from a UI object library may be added directly to an RPA workflow activity, saving developer time that may otherwise be required to create a custom selector for the activity. The object browser may provide a database storing created selectors in object libraries to enable the reusability of UI descriptors. An object library is defined herein as a collection of UI descriptors corresponding to one or more screens from a certain version of an application. A UI descriptor is a set of instructions for finding a UI element.

Web browser 310 runs web applications and provides information pertaining to these web applications via a network 320 (e.g., a local area network (LAN), a mobile communications network, a satellite communications network, the Internet, any combination thereof, etc.) to a server 330 in a cloud environment. Server 330 runs a hosting environment 332 (e.g., a container, a VM, or an operating system session) including automations 334 and RPA robots 336 that interact with web browsers 310 via the extensions and/or implement their own process(es) separate from web browsers 310. See FIG. 6B. For instance, automations 334 and RPA robots 336 may run within a VM or a container and may be headless in some embodiments. Server 330 may store data for automations 334 (e.g., different versions of automations 334, an object repository, etc.) in a database 340 in some embodiments and load them or otherwise make them available for execution by RPA robots 336.

RPA robots 336 differ from automations 334 in that RPA robots 336 are machine-side services that are installed and run on a given computing system, such as server 330. RPA robots 336 may wait for requests for a conductor application (e.g., UiPath Orchestrator™), an RPA designer application, etc. and then run the requested automation after receipt of the request. A respective RPA robot 336 receives the definition of an automation 334 in the form of machine-readable code or a script and runs it. Automations 334, on the other hand, are the embodiments of workflows in the form of a package, for example. Packages are used and run by RPA robots 336 in some embodiments.

Automations 334 may be designed by an RPA developer using a web-based RPA designer application 352 running on computing system 350. However, in some embodiments, the web-based RPA designer application is remote to computing system 350 and accessed via a web browser. The RPA developer can create or select projects, create or modify RPA workflows, add/modify/remove RPA workflow activities, etc. In some embodiments, web-based RPA designer application 352 allows the RPA developer to select elements from a UI object repository and use these elements in activities of the RPA workflows via respective UI descriptors. The RPA developer may also cause automations 334 to be generated on server 330, perform testing, and deploy automations 334 once ready to be used by end users, used as part of a pool by server 330, deployed in containers, VMs, or operating system sessions 332, etc. In some embodiments, automations are generated locally in the web browser of computing system 350 and tested and validated there rather than being run remotely.

Figure 4A:
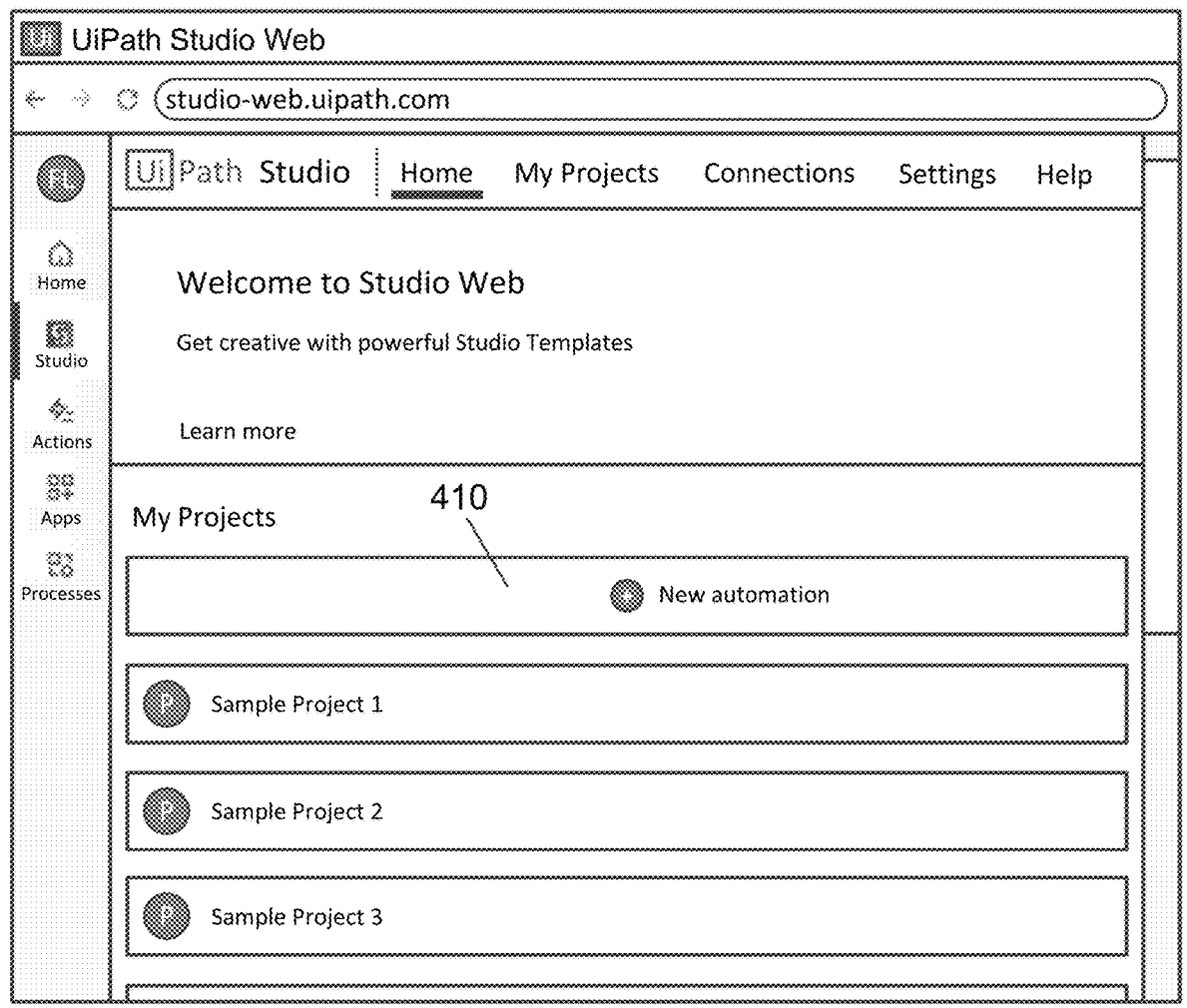
FIG. 4A illustrates a home page view of a web-based RPA development application webpage, according to an embodiment of the present invention.

FIG. 4A is a screenshot illustrating a home page view of a web-based RPA development application webpage 400, according to an embodiment of the present invention. Various sample projects may be displayed to the user if these have been created. The RPA developer can create a new automation by clicking new automation button 410. In some embodiments, other options may be presented, such as a set of project types that may include, but are not limited to, process, library project, test automation project, trigger-based process, etc. The user may also reopen, edit, and re-publish projects that have already been created.

Figure 4B:
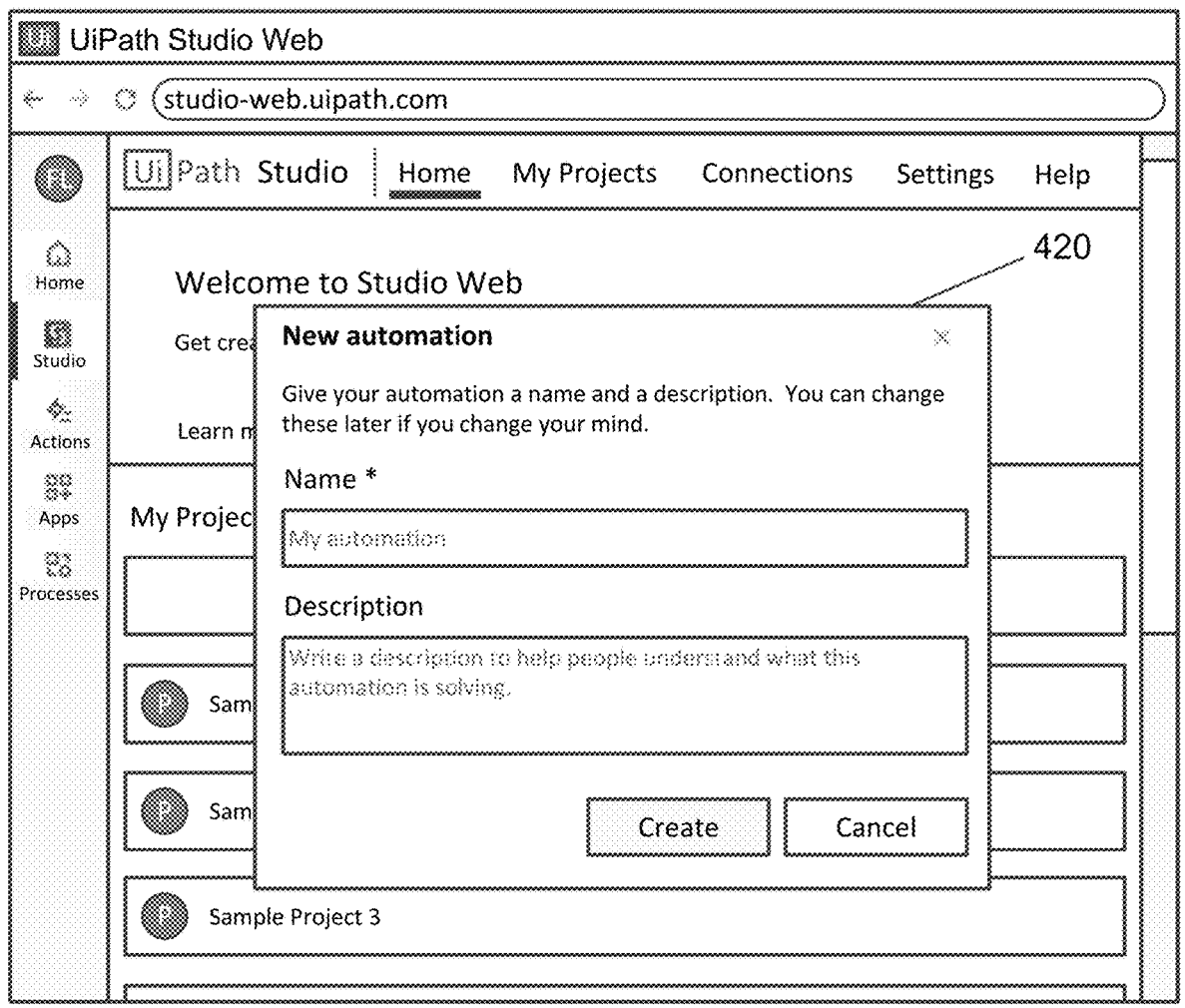
FIG. 4B illustrates the home page view of the web-based RPA development application webpage with a new automation window displayed, according to an embodiment of the present invention.

When the RPA developer clicks new automation button 410, a new automation window 420 appears. See FIG. 4B. The user can enter a name and description for the automation and create a new project by clicking a create button. However, any other desired information may be provided without deviating from the scope of the invention, such as the developer(s), the target company, etc.

Figure 4C:
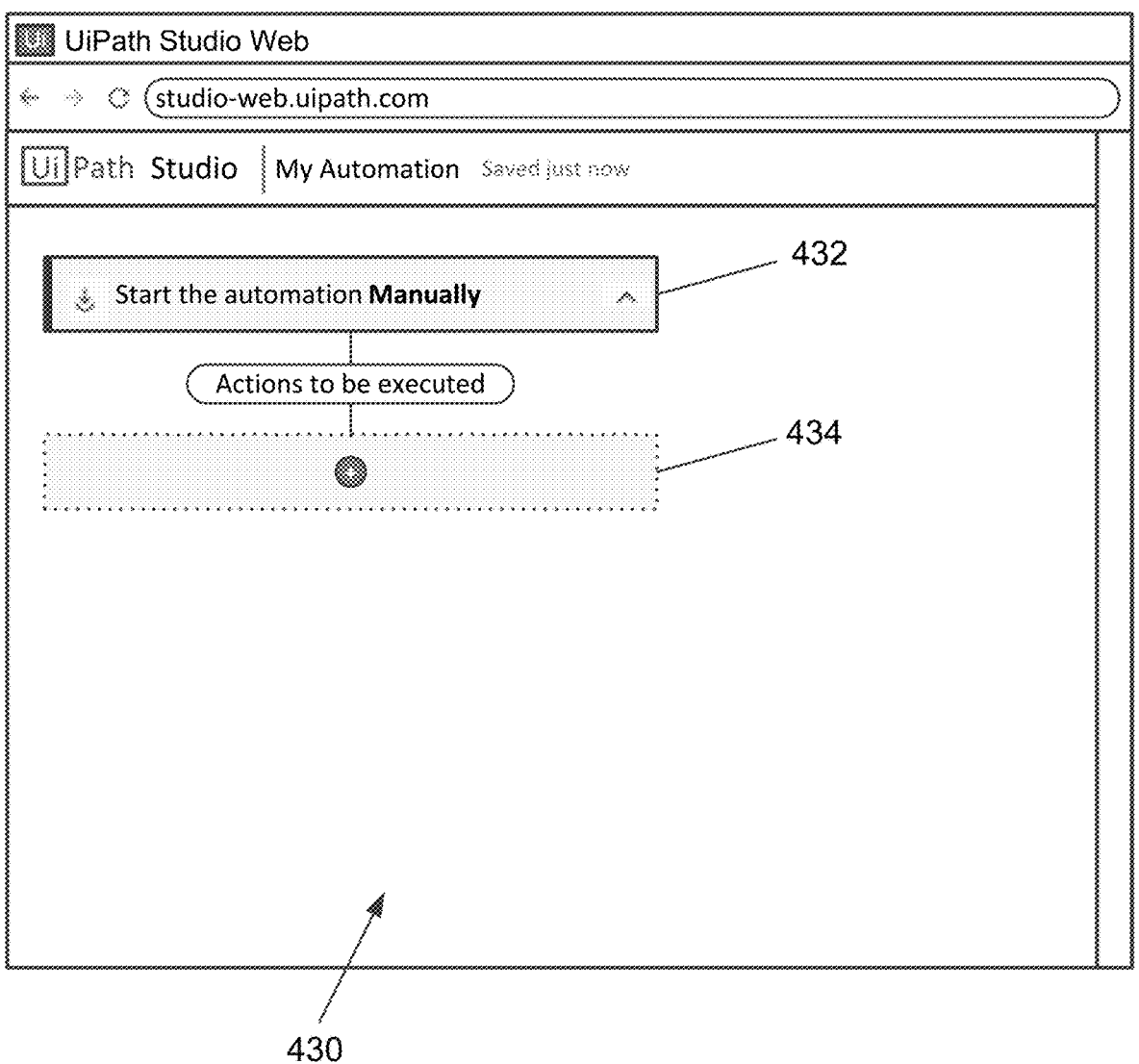
FIG. 4C illustrates a canvas view of the web-based RPA development application webpage, according to an embodiment of the present invention.

After the RPA developer creates a new automation project, a canvas 430 appears where the automation can be designed. See FIG. 4C. A starting option designation 432 allows a user to indicate how the automation will start. Here, the automation is configured to start manually. However, the user may change the start condition to another option, such as based on a trigger (e.g., a user clicking a button on a webpage, a certain webpage being opened, a web form being submitted, etc.), based on a desired start time, based on a desired periodic run time (e.g., the first of each month at midnight), etc. Activities can be added by the user by clicking empty activity 434.

Figure 4D:
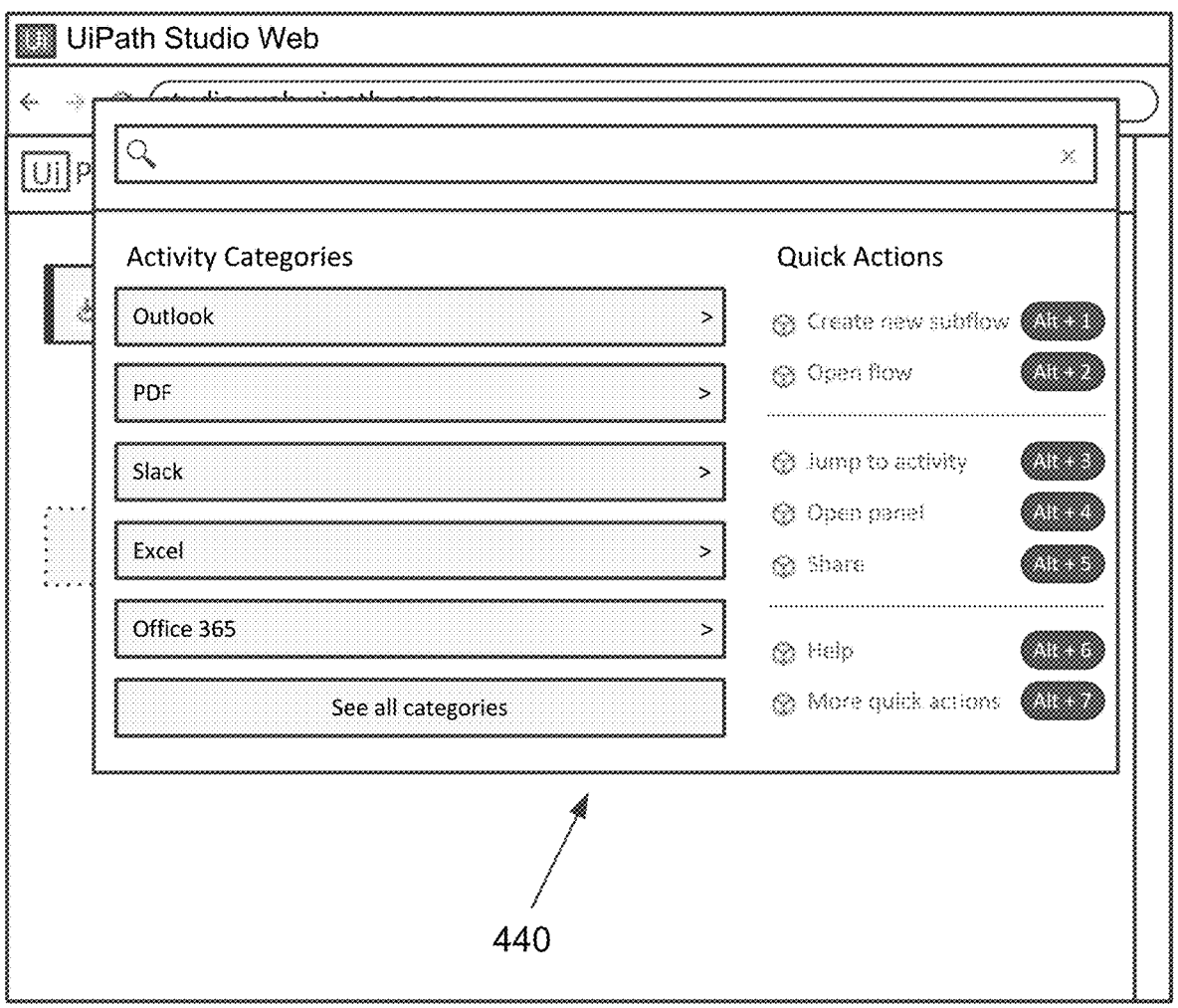
FIG. 4D illustrates the canvas view of the web-based RPA development application webpage with an activity categories and quick actions window, according to an embodiment of the present invention.
Figure 4E:
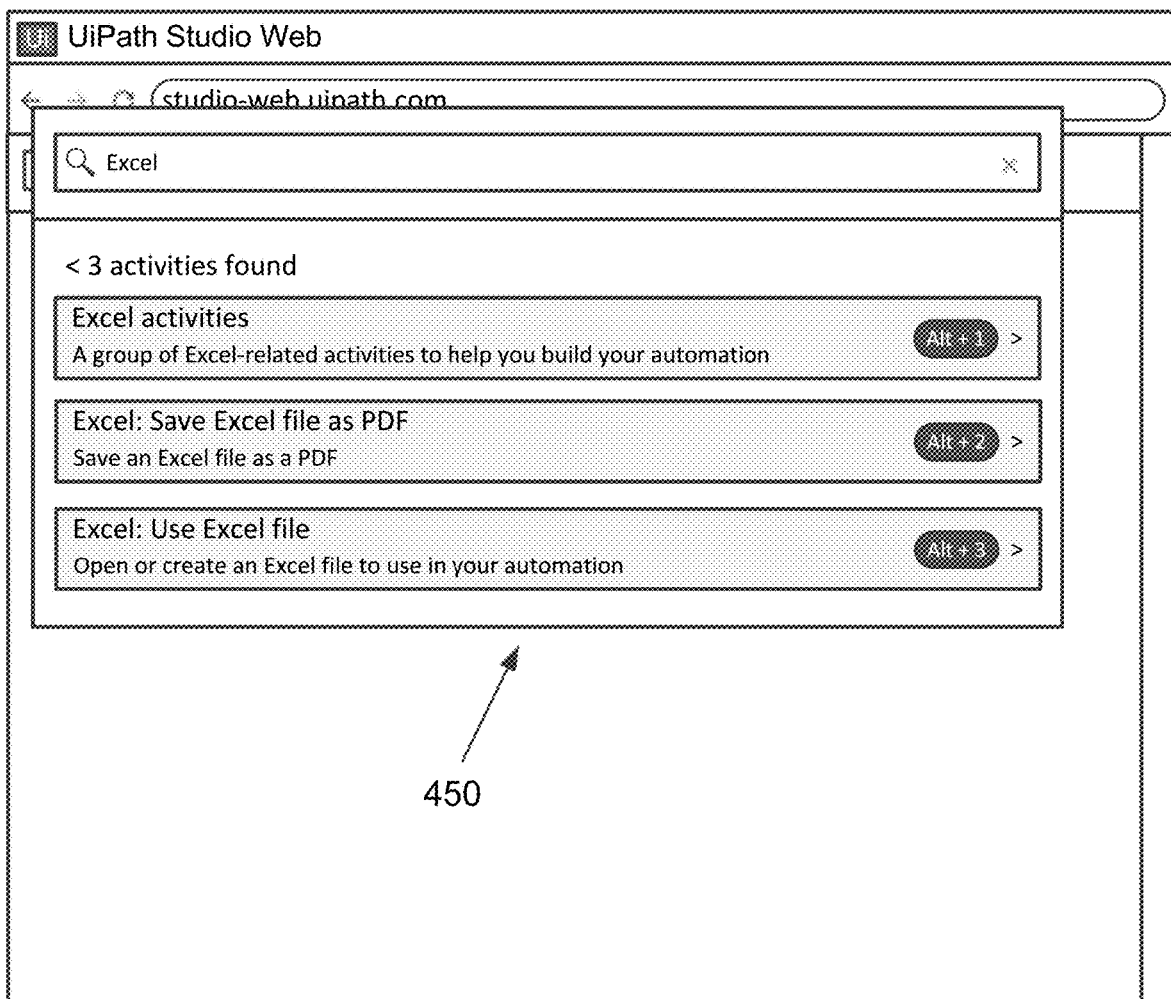
FIG. 4E illustrates the canvas view of the web-based RPA development application webpage with an Excel® activities window, according to an embodiment of the present invention.

When the user clicks empty activity 434, an activity categories and quick actions window 440 appears. See FIG. 4D. The user can search for or choose from the listed categories. For instance, if the user clicks Excel®, an Excel® activities window 450 appears with options for Excel® activities. See FIG. 4E.

Figure 4F:
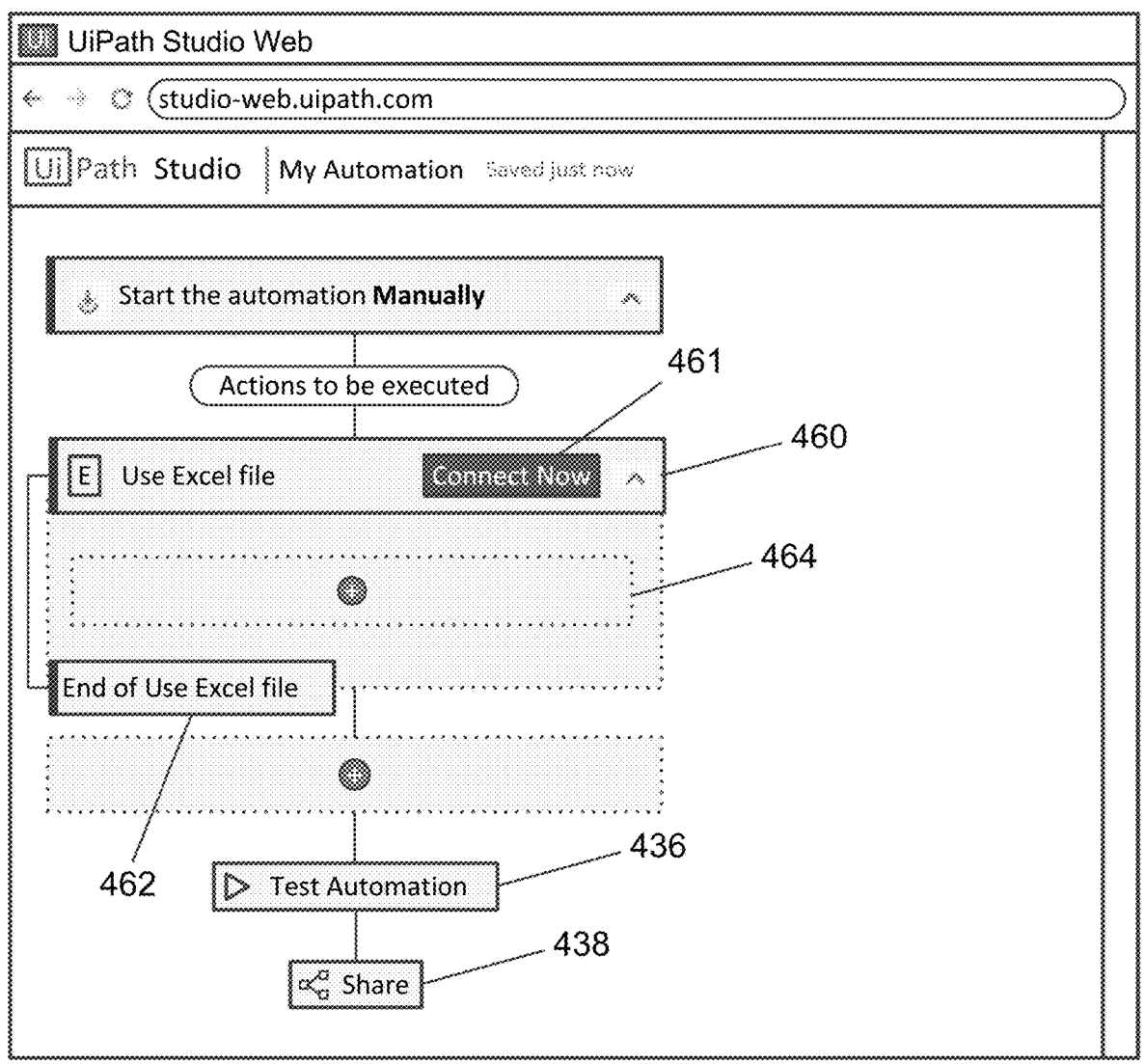
FIG. 4F illustrates the canvas view of the web-based RPA development application webpage with an unconfigured use Excel® file activity, according to an embodiment of the present invention.

If the user chooses to use an Excel® file, a use Excel® file activity 460 is created that can be configured once the user provides connection information after clicking Connect Now button 461. For certain applications, permissions need to be granted to the web-based RPA designer application, a robot tray process (e.g., UiPath Assistant™), or other services to access applications and other processes. Credentials may be saved and reused for future automations. When the RPA robot executes an automation, the RPA robot may look at the connections that the automation needs and under which credentials the automation will run. The RPA robot may be configured to access these credentials without changing the underlying workflow logic, and may ask a user to enter credentials if they cannot be found or do not work properly. Files may be hosted in the cloud, stored in a remote database, etc. The end of the activity is designated by an end of use Excel® file indicator 462. See FIG. 4F.

Other activities, conditional logic, etc. can be added and configured within use Excel® file activity 460 by clicking empty activity 464. This may bring up the same or a similar window to window 440 of FIG. 4D. An option 436 to run a test automation and an option 438 to share the UI automation project also appear. This may allow the user to validate workflows as they are created, as well as share their work with others.

Figure 4G:
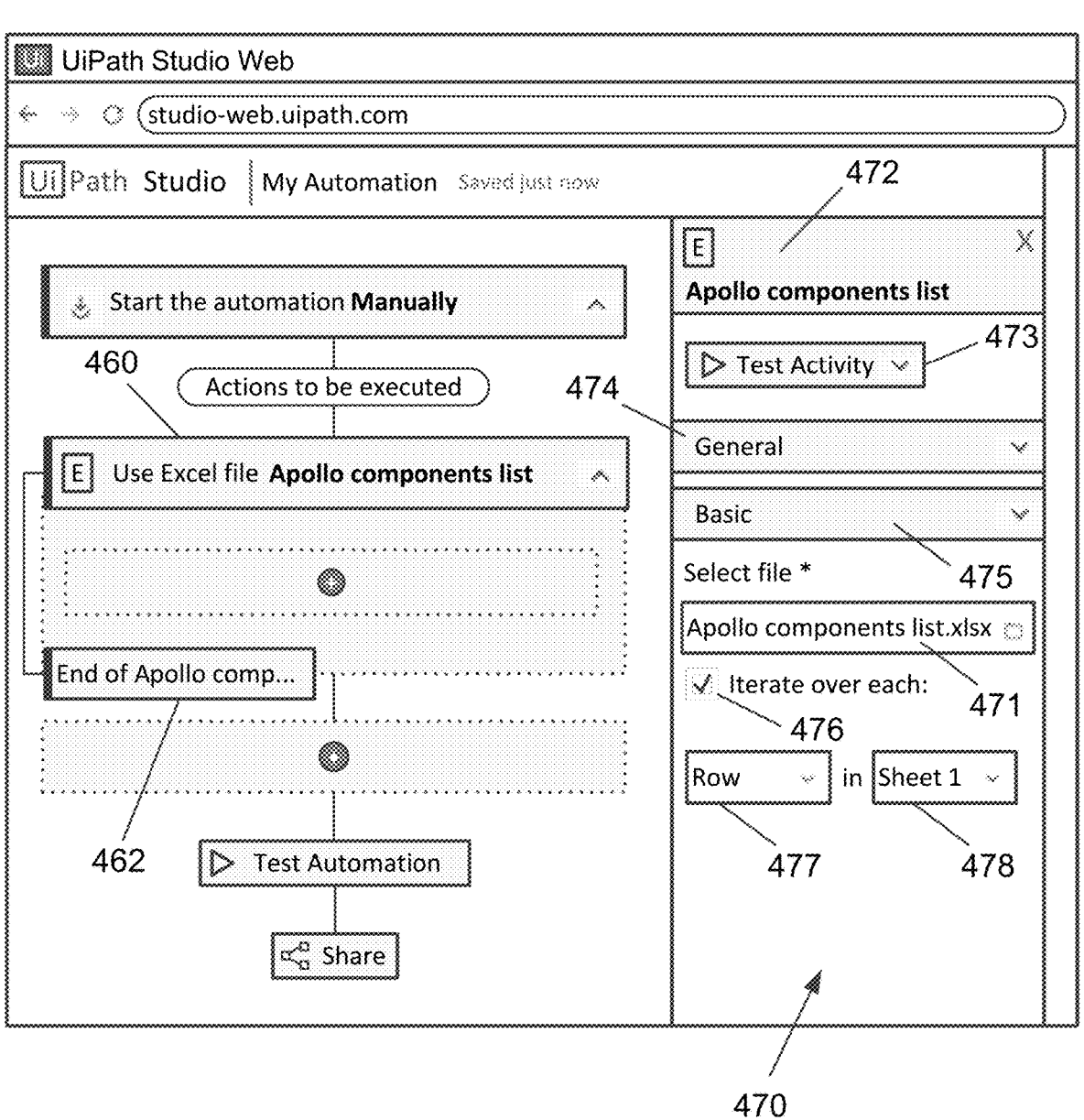
FIG. 4G illustrates the canvas view of the web-based RPA development application webpage after the use Excel® file activity has been configured, according to an embodiment of the present invention.

When the user configures an activity, various options appear. For instance, if the user clicks Connect Now button 461 and provides login information to access a remote file and/or application, options appear on the right side in an options pane 470. See FIG. 4G. In this case, the user selects the Excel® file "Apollo components list.xlsx" from file selection menu 471. The file name appears in file name listing 472. The user can test the configuration of the activity using test activity menu 473, as well as configure general options 474 and basic options 475, which are groupings of properties specific to a given activity. More specific options can also be configured. For instance, the user can choose iterate over each checkbox 476, which allows the user to select the element in the spreadsheet that the activity will iterate over. Here, the user has selected "Row" with option 477 and "Sheet 1" of the spreadsheet with option 478.

In some embodiments, users may or may not be allowed to publish or run automations with analysis errors, depending on governance rules. Validation errors are prerequisites to running and publishing automations in some embodiments, and may be permitted for all users. However, static code analysis errors may not be permitted, and may be identified as such.

To test automations that have been developed with a web-based RPA designer, such as that shown in FIGS. 4A-G, execution may happen server-side (e.g., in the cloud) as opposed to on the developer's computing system. No further configuration may be needed by the RPA developer other than to design the automation and execute it. Execution may happen on a remote VM, which may or may not be configured by the RPA developer in a conductor application, such as UiPath Orchestrator®, for example. The RPA developer may be notified of a successful execution or provided with execution errors and/or violations of governance rules via the web browser portion of the web-based RPA designer. In certain embodiments, RPA workflows may be reviewed by individuals with the appropriate permissions before the automation is approved and published for production use (i.e., runtime use).

It should be noted that FIGS. 4A-G are provided by way of example only, and that various other activities and conditions may be configured without deviating from the scope of the invention. For instance, the RPA developer may choose to perform different actions on the Excel® file if different conditions exist (for instance, sending an email regarding a deadline for a component has passed if it has passed versus sending an email with a new finalized component and writing to a cell that updates a status in Excel® if the component is not past due, sending emails and/or messages in other non-email applications, etc. Automations may be designed using the web-based RPA designer of some embodiments that can interact with a webpage, obtain information from the webpage, and perform desired RPA robot actions on the server side that may include interaction with the users webpage, interacting with other RPA robots on the server side or locally on user computing systems, retrieving information from a database, or any other RPA process without deviating from the scope of the invention. Per the above, in certain embodiments, the automation may be performed partially or entirely on the server-side via a VM or a container.

Figure 5:
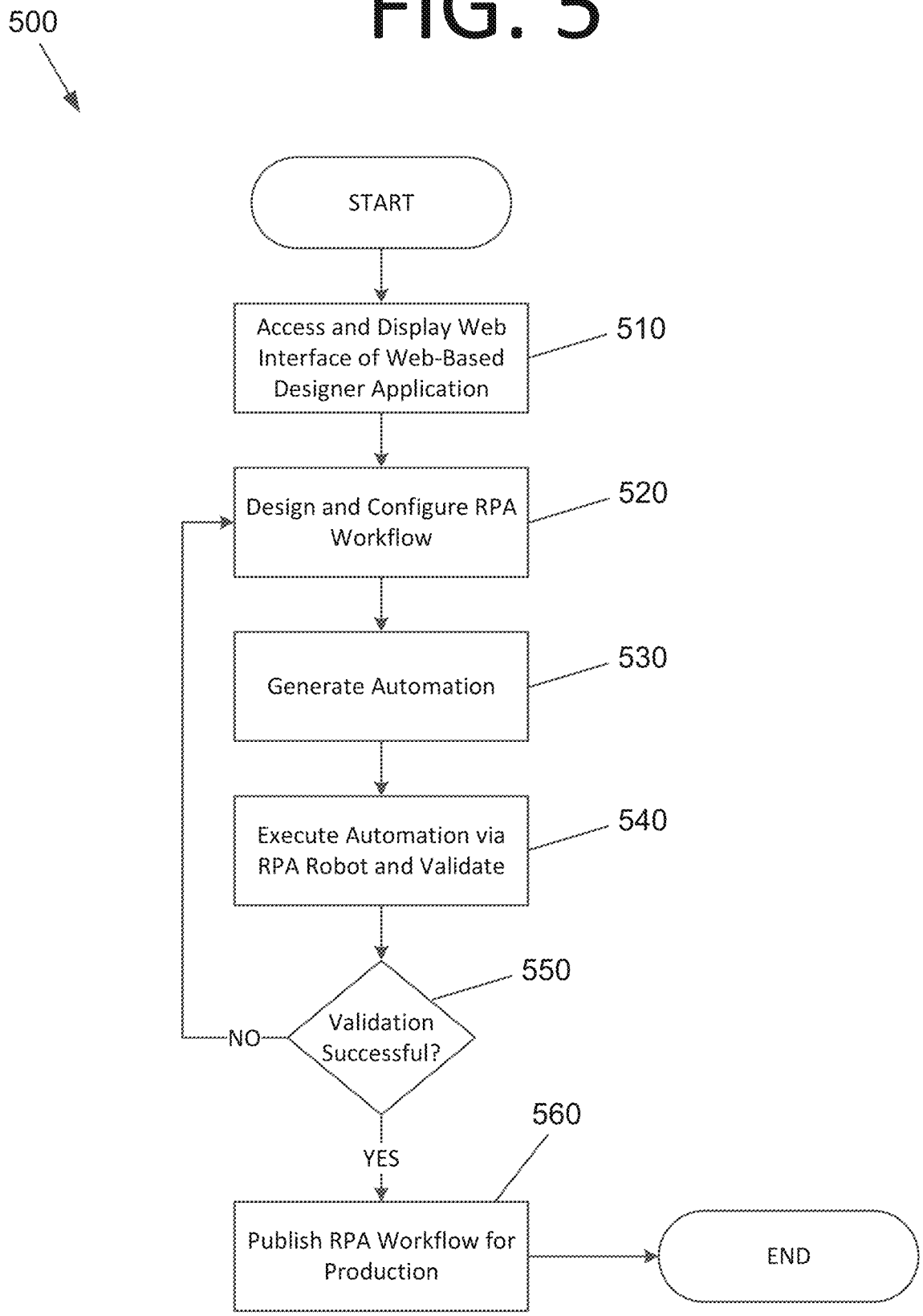
FIG. 5 is a flowchart illustrating a process for performing web-based RPA development at design time, according to an embodiment of the present invention.

FIG. 5 is a flowchart 500 illustrating a process for performing web-based RPA development at design time, according to an embodiment of the present invention. The process begins with accessing and displaying a web interface of a web-based designer application on a web browser at 510. The web interface allows a user to create RPA projects, configure RPA workflows, and submit RPA workflow configurations to a server-side web-based RPA designer application to generate, execute, and validate automations remotely. An RPA workflow is designed and configured by the web-based designer application via the web interface at 520.

After the user is satisfied with the RPA workflow, or when the user otherwise wants to perform testing and validation, the user, via the web interface, causes the server-side web-based RPA designer application to generate an automation implementing the workflow at 530. The server-side web-based RPA designer application then executes the automation via an RPA robot and validates the automation at 540. If the validation fails at 550, the user may continue designing and configuring the RPA workflow at 520. If the validation succeeds, the RPA workflow/project may be published for production (runtime) use at 560. For instance, this may involve generating the automation code and running the automation code via an RPA robot in a VM, a container, or an operating system session. In some embodiments, the process may then proceed to the steps of FIG. 6, 7, or 9.

Figure 6:
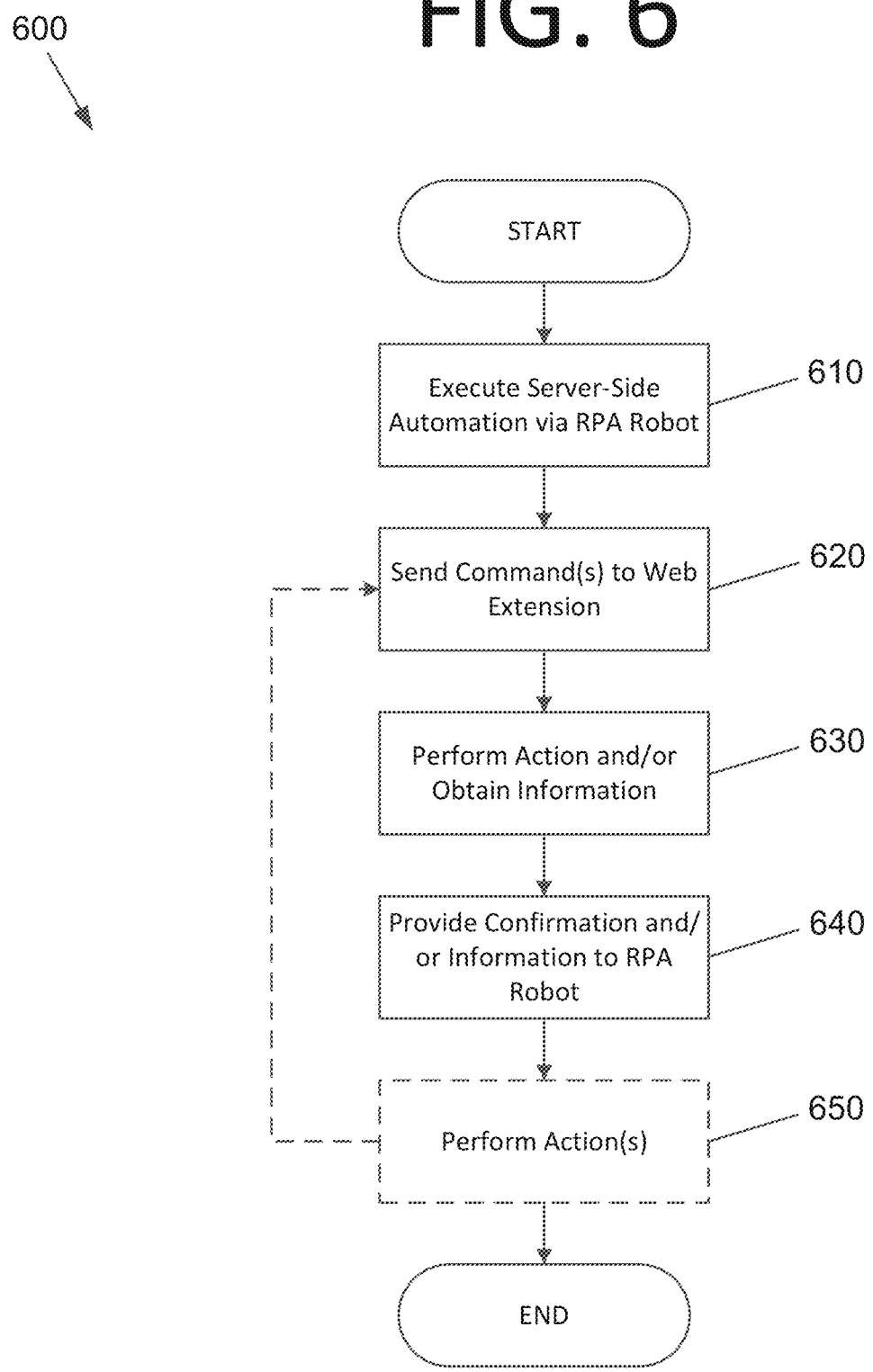
FIG. 6 is a flowchart illustrating a process for executing an automation at runtime that interacts with a web extension, according to an embodiment of the present invention.

FIG. 6 is a flowchart illustrating a process 600 for executing an automation at runtime that interacts with a web extension, according to an embodiment of the present invention. The process begins with executing a server-side automation at 610 via an RPA robot. The server-side automation may be scheduled, caused to execute manually, executed based on a trigger, etc. The trigger may be an application event, a user interaction with a webpage occurring, a certain time elapsing, etc. The RPA robot then sends one or more commands to a web extension of a web browser (e.g., on a client-side computing system, in a VM, in a container, etc.) at 620 to interact with the web browser, obtain information from one or more webpages in one or more tabs of the web browser, or both. The web extension then interacts with the web browser, obtains the information from one or more webpages in one or more tabs of the web browser, or both, as requested by the RPA robot at 630. In some embodiments, the web extension provides native functionality that can be executed headlessly when the automation runs in a container, for example, and as a result of being defined with this extension. Such functionality could be implemented in some embodiments for desktop/laptop computers, thin clients, thick clients, etc. Information may be obtained from the local computing system and/or browser interactions may be performed locally.

The web extension then provides confirmation that the requested interaction occurred, provides the requested information, or provides an error message if there was a problem at 640, which the RPA robot receives. In some embodiments, this may be the task that the automation was designed to achieve. However, if the automation was designed to perform some additional processing or other actions based on information from the web extension, such as performing a database lookup, sending an email, writing to and saving a file, requesting additional actions and/or information from the web extension, etc., the RPA robot may perform these actions at 650. The process may also return to step 620 for one or more other commands.

Figure 7:
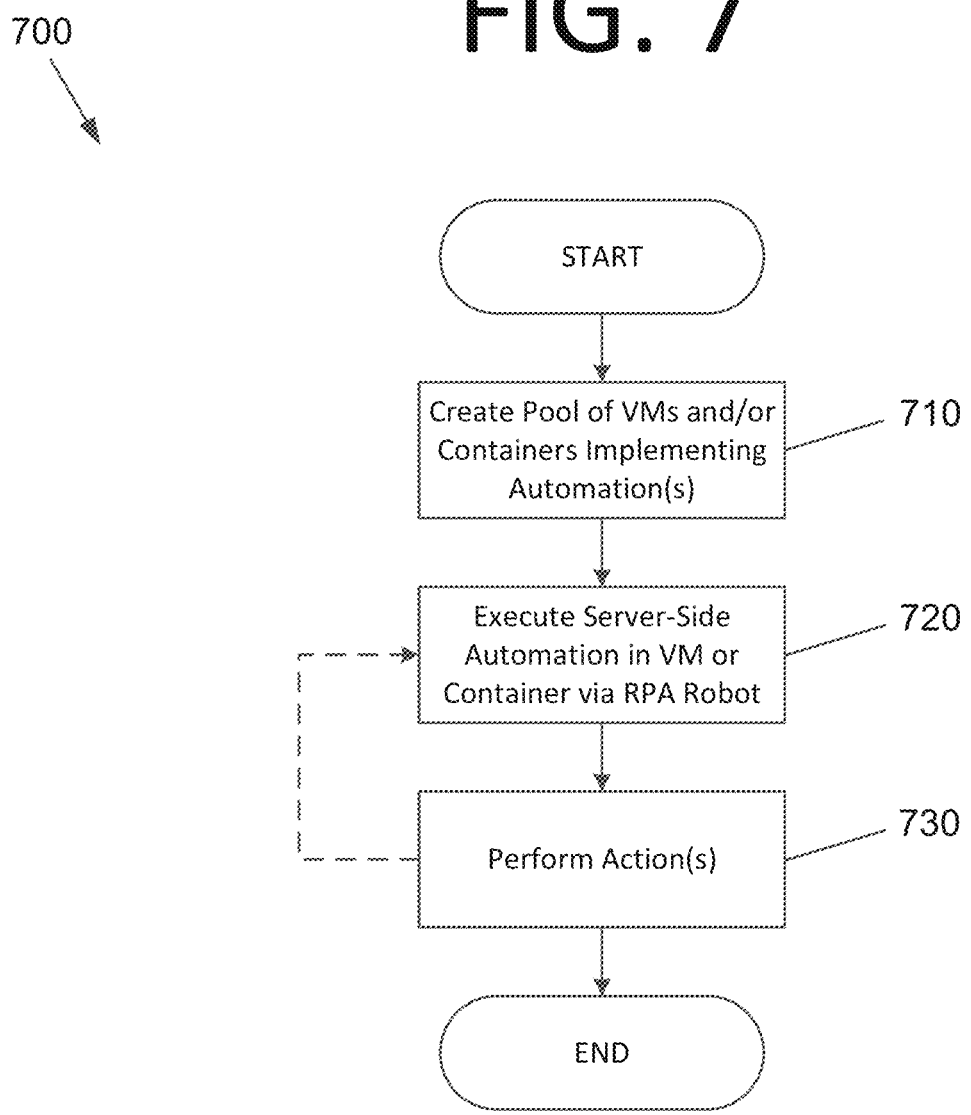
FIG. 7 is a flowchart illustrating a process for executing an automation at runtime that runs in a VM or a container, according to an embodiment of the present invention.

FIG. 7 is a flowchart illustrating a process 700 for executing an automation at runtime that runs in a VM or a container, according to an embodiment of the present invention. The process begins with creating a pool of VMs and/or containers implementing respective automations at 710. The pool may be elastically provisioned or manually provisioned, for example. A server-side automation is then executed in a VM, a container, or an operating system session at 720 by an RPA robot. The server-side automation may be scheduled, caused to execute manually, executed based on a trigger, etc. The RPA robot then performs the actions designed in the automation workflow at 730.

Figure 3B:
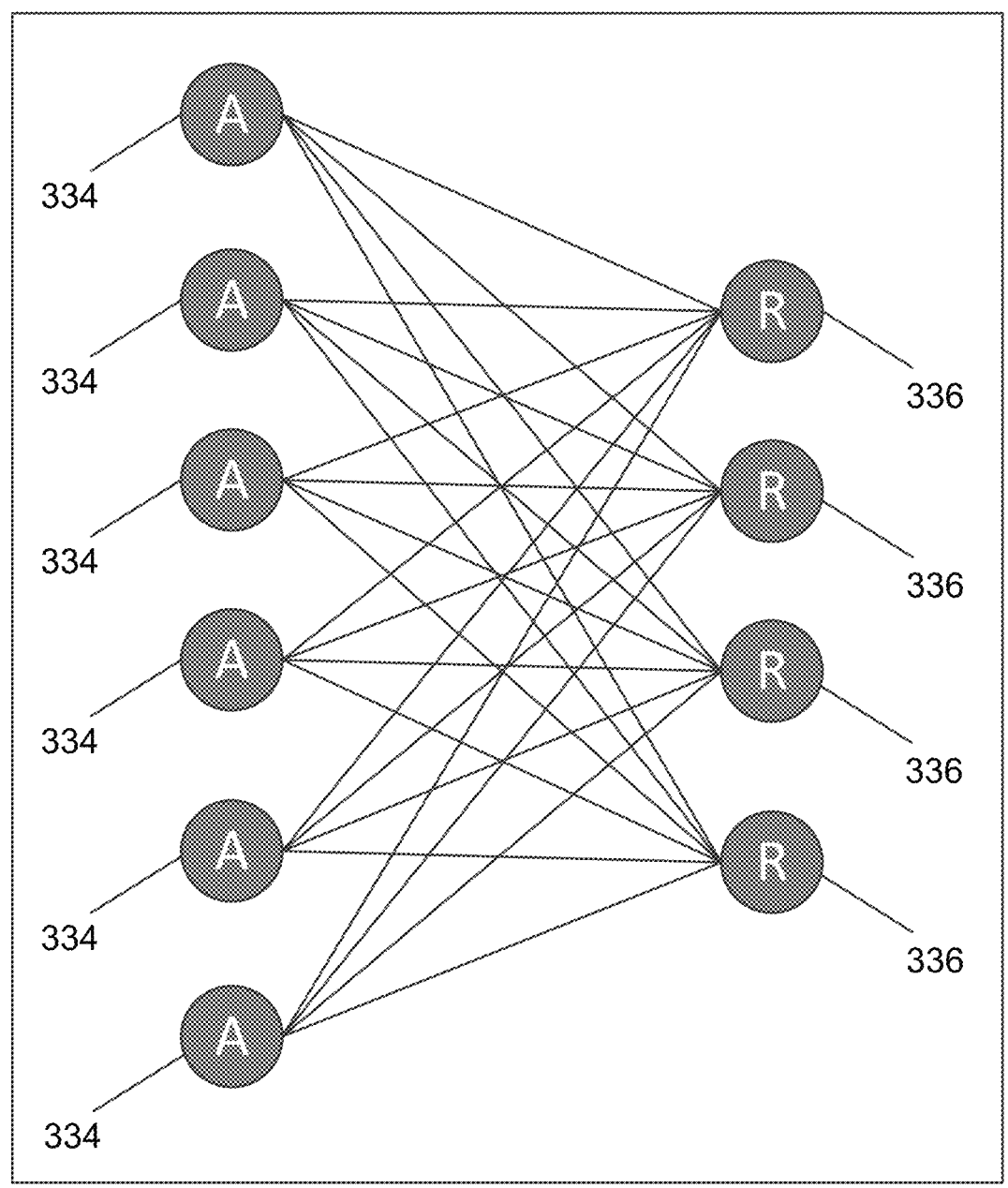
FIG. 3B illustrates automations and RPA robots running in a container, a VM, or an operating system session, according to an embodiment of the present invention.
Figure 8:
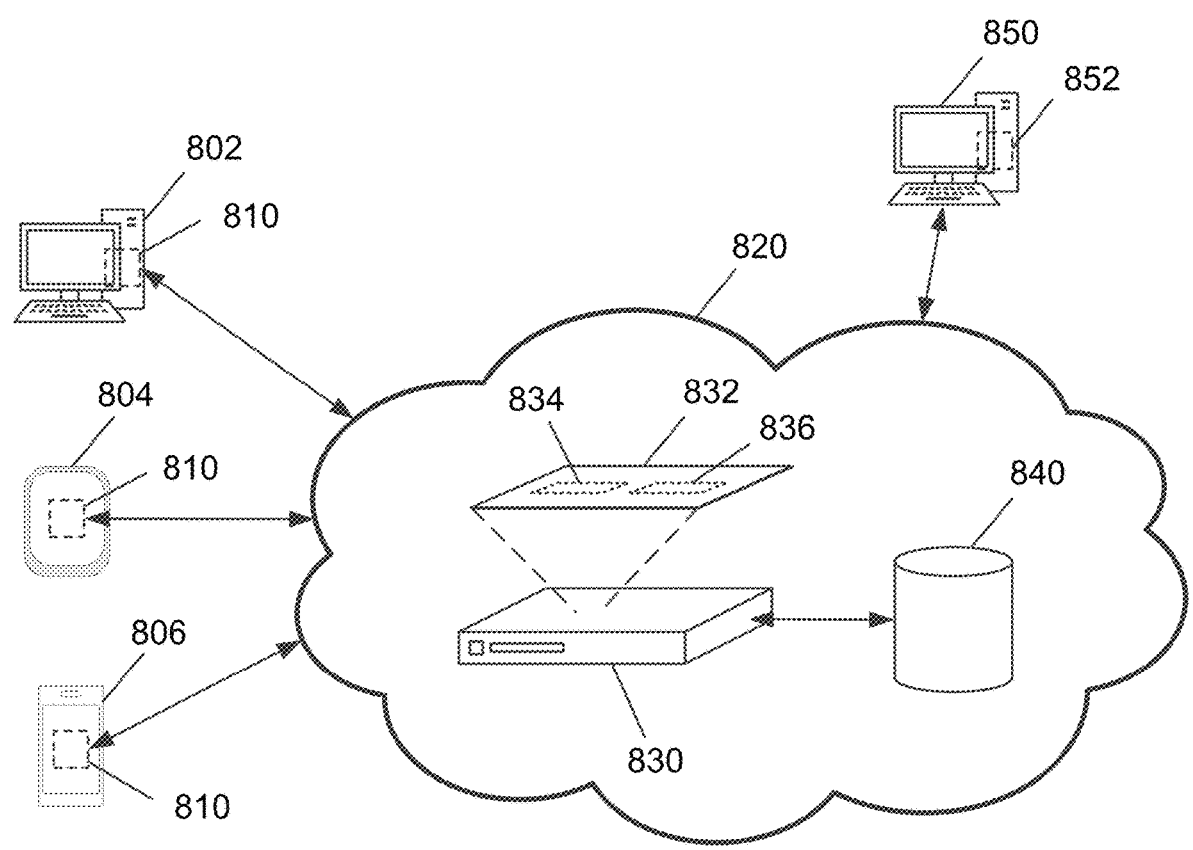
FIG. 8 is an architectural diagram illustrating a web-based RPA system configured to interact with local applications, according to an embodiment of the present invention.

In some embodiments, a web-based designer system may be used to design automations that interact with local instances of applications running on a computing system via a local RPA extension process. The local RPA extension process may receive communications from RPA robots running remotely in a container, VM, or operating system session, interact with local applications, and send information back to the requesting RPA robots. FIG. 8 is an architectural diagram illustrating a web-based RPA system 800 configured to interact with local applications, according to an embodiment of the present invention. Similar to system 300 of FIGS. 3A and 3B, system 800 includes a desktop computer 802, a tablet 804, a smart phone 806, a network 820, a server 830, a hosting environment 832, a database 840, a developer computing system 850, and a web-based RPA designer application 852. Also similar to system 300, hosting environment 832 includes automations 834 and RPA robots 836.

However, in system 800, desktop computer 802, tablet 804, and smart phone 806 run a local RPA extension process 810 that extends the functionality of RPA robots 836 to interact with applications running on desktop computer 802, tablet 804, and smart phone 806. Local RPA extension process 810 may receive a request from an RPA robot 836 executing an automation 834 via network 820. For instance, local RPA extension process 810 may be listening on a port for communications. Any suitable communication protocol (e.g., Transmission Control Protocol (TCP)/Internet Protocol (IP), File Transfer Protocol (FTP), etc.) may be used without deviating from the scope of the invention.

Local RPA extension process 810 may parse the request from RPA robot 836 and perform an associated action and/or retrieve requested information. For instance, the request from RPA robot 836 may ask local RPA extension process 810 to use an API for Outlook® to search a user's email for the term "invoice", retrieve matching results, and send the results back to RPA robot 836. RPA robot 836 can then use this information to continue carrying out the logic of automation 834.

In some embodiments, local RPA extension process 810 may communicate with other processes running on the respective computing system using Inter-Process Communication (IPC) protocols. IPC protocols are mechanisms by which processes running in an operating system can communicate with other processes also running on that operating system, potentially in different sessions. These protocols may facilitate communication via network 820, pipes, Component Object Model (COM), Remote Procedure Calls (RPC), sockets, etc. IPC protocols may be used to send information, requests, commands, and the like between running processes.

Figure 9:
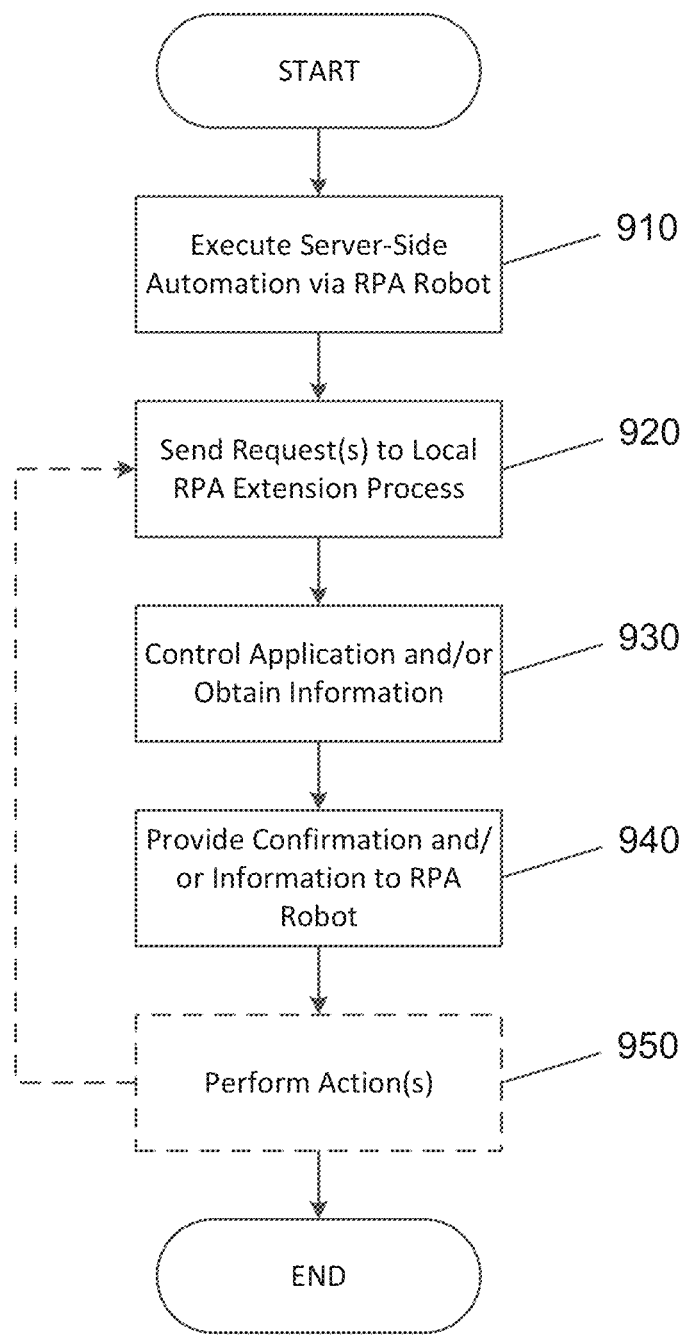
FIG. 9 is a flowchart illustrating a process for executing an automation at runtime that interacts with a local RPA extension process running on a different computing system than an RPA robot, according to an embodiment of the present invention.

FIG. 9 is a flowchart illustrating a process 900 for executing an automation at runtime that interacts with a local RPA extension process running on a different computing system than an RPA robot, according to an embodiment of the present invention. The process begins with executing a server-side automation via an RPA robot at 910. The server-side automation may be scheduled, caused to execute manually, executed based on a trigger, etc. The trigger may be an application event, a user interaction with a webpage occurring, a certain time elapsing, etc. The RPA robot then sends one or more requests to a local RPA extension process running on a remote computing system (e.g., on a client-side computing system, in a remote VM, in a remote container, etc.) at 920 to interact with one or more applications and/or processes (e.g., operating system processes, processes associated with applications, etc.) running locally to the local RPA extension process. The local RPA extension process then controls one or more applications (e.g., via APIs) and/or processes to perform the desired operations in the application(s), obtains information from the application(s) and/or other processes on the computing system, or both, at 930. The local RPA extension application then provides confirmation that the requested interaction(s) with the application(s) occurred, provides the requested information, or both, at 940. In some embodiments, an error message may be provided if there was a problem, which the RPA robot receives.

In some embodiments, this may be the task that the automation was designed to achieve. However, if the automation was designed to perform some additional processing or other actions based on information from the web extension, such as performing a database lookup, sending an email, writing to and saving a file, requesting additional actions and/or information from the web extension, etc., the RPA robot may perform these actions at 950. The process may also return to step 920 for one or more other requests.

Figure 10:
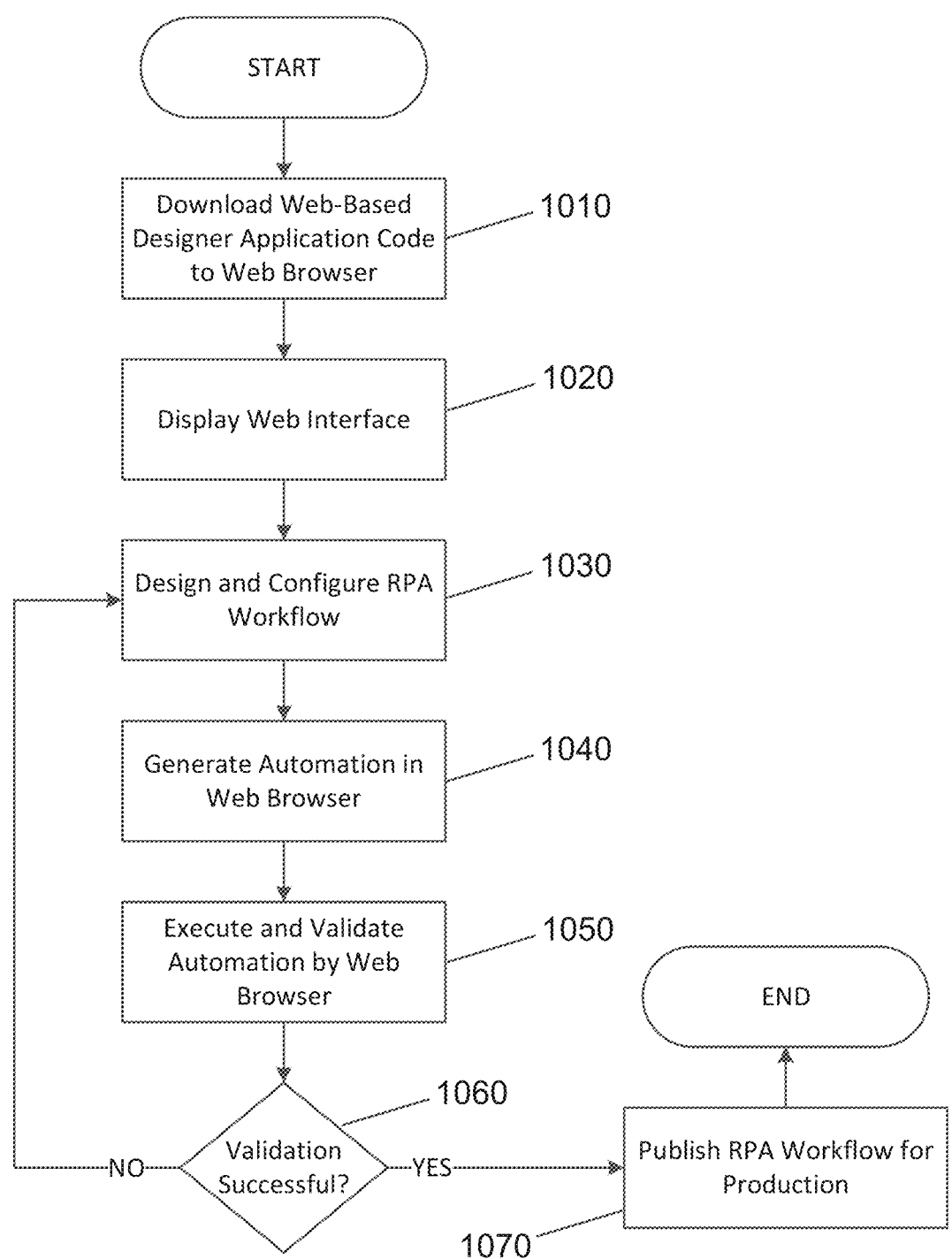
FIG. 10 is a flowchart illustrating a process for performing web-based RPA development at design time via a web browser without an RPA robot, according to an embodiment of the present invention.

FIG. 10 is a flowchart illustrating a process 1000 for performing web-based RPA development at design time via a web browser without an RPA robot (i.e., robotless), according to an embodiment of the present invention. "Robotless," as used herein, means that RPA robot-like functionality is included in the web browser, but an RPA robot is not run as a separate service. As such, there is no need to install local client-side binaries on a computing system on which the web browser is run, and only a web browser is needed in some embodiments. Robot-like binaries may be included within the tab and served from the web server on load. HTML, JavaScript™, etc. may also be loaded at that time.

The process begins with downloading code for a web-based RPA designer application to a web browser at 1010. The code allows users to both create and execute automations. This code may include executable binaries, such as DLLs, that are loaded in a tab for the web browser. This is atypical since other formats, such as JavaScript™ are typically loaded. However, it should be noted that any suitable code that includes the automation execution functionality, such as JavaScript™, Servlets™, etc., may be used without deviating from the scope of the invention. A web interface for the web-based RPA designer application is displayed in the web browser at 1020. The web interface is configured to provide functionality to create RPA projects and configure RPA workflows, as well as to generate and execute automations therefrom. An RPA workflow is designed and configured by the web-based designer application via the web interface at 1030.

After the user is satisfied with the RPA workflow, or when the user otherwise wants to perform testing and validation, the web browser generates an automation for a configured RPA workflow at 1040. This automation may run as a browser worker process instead of the regular browser process. The web browser then executes and validates the generated automation at 1050. If the validation fails at 1060 (e.g., there are errors or governance rules are violated), the user may continue designing and configuring the RPA workflow at 1030. If the validation succeeds, the RPA workflow/project may be published for production (runtime) use at 1070. For instance, this may involve generating the automation code for a web browser and running the automation code the web browser in a VM, a container, or an operating system session. In some embodiments, the process may then proceed to the steps of FIG. 11.

The mechanism for executing and debugging the automation is loaded in the web browser itself in this embodiment. This does not require a remote VM, container, or operating system session, for example. In other words, when the user runs the automation, the code is not transferred to be executed in a remote container, a remote VM, or a remote operating system session. Instead, the automation design time and runtime functionality is in the web browser, potentially in the same tab in some embodiments. The functionality for executing the automation can be loaded in the web browser when the web page for the web-based RPA designer application is loaded. This does not require a web browser extension in some embodiments. Thus, the tab itself essentially becomes both the design time RPA designer and the runtime RPA robot, and users can create, execute, and debug automations. In some embodiments, automations can also be designed that run in a web browser of a production server rather than being executed by production RPA robots.

FIG. 11 is a flowchart illustrating a process 1100 for executing an automation at runtime in a web browser of a container, VM, or operating system session, according to an embodiment of the present invention. The process begins with executing a server-side automation at 1110 via a web browser running in a container, a VM, or an operating session of the server. This form of automation alone is novel. However, in some embodiments, the automation sends commands to a web extension or a local RPA extension process running on a remote computing system at 1120, similar to processes 600 and 800 of FIGS. 6 and 8, respectively. The web extension or local RPA extension process then performs the requested action and/or obtains requested information at 1130 and provides confirmation and/or information to the web browser in the container, VM, or operating session of the server at 1140. The web browser may then perform additional actions associated with the automation at 1150.

The process steps performed in FIGS. 5-7 and 9-11 may be performed by a computer program, encoding instructions for the processor(s) to perform at least part of the process(es) described in FIGS. 5-7 and 9-11, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 210 of computing system 200 of FIG. 2) to implement all or part of the process steps described in FIGS. 5-7 and 9-11, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
   a developer computing system comprising a web browser; and
   a development server providing a web-based robotic process automation (RPA) designer application, the web-based RPA designer application configured to facilitate creation and configuration of RPA workflows by a user, wherein
   the web-based RPA designer application is configured to cause the web browser to:
      download code for the web-based RPA designer application, the downloaded code comprising executable binaries for automation functionality,
      load the executable binaries into a tab of the web browser,
      display a web interface for the web-based RPA designer application in the tab of the web browser, the web interface configured to provide functionality for the user to create RPA projects and configure RPA workflows,
      generate an automation for a configured RPA workflow in the web browser, and
      execute and validate the generated automation in the web browser using a browser worker process.

2. The system of claim 1, wherein code for executing and validating the generated automation is included in the downloaded code.

3. The system of claim 1, wherein the downloaded code is executed as part of a same tab of the web browser as the web interface of the web-based designer application.

4. The system of claim 1, wherein the generated automation is configured to be executed at runtime without an RPA robot.

5. The system of claim 1, wherein the generated automation is configured to be executed by a production RPA robot at runtime remotely in an operating system session, a virtual machine (VM), or a container.

6. The system of claim 1, wherein the generated automation is configured to be executed by a production web browser at runtime remotely in an operating system session, a virtual machine (VM), or a container.

7. The system of claim 1, wherein the web-based RPA designer application is configured to retrieve user interface (UI) elements organized according to a taxonomy from a UI object repository.

8. The system of claim 7, wherein the UI object repository comprises applications, screens, UI elements, and UI descriptors organized such that the applications group screens, the screens group UI elements, and the UI descriptors enable location of and interaction with the UI elements.

9. The system of claim 1, wherein the generated automation is a serverless automation.

10. The system of claim 1, wherein the web-based RPA designer application is configured to provide a canvas that facilitates creation and modification of RPA workflows.

11. The system of claim 1, wherein the web-based RPA designer application is configured to provide options for how an automation will start.

12. The system of claim 1, wherein the web-based RPA designer application is configured to display an empty activity and provide activity categories and actions when a user clicks the empty activity.

13. The system of claim 1, wherein the web-based RPA designer application is configured to provide activity configuration options based on a type of the activity.

14. The system of claim 1, wherein the web-based RPA designer application is configured to prevent users from publishing or running automations with static code analysis errors in accordance with governance rules.

15. The system of claim 1, wherein when the generated automation fails validation, the web-based RPA designer application is configured to require correction of validation errors or compliance with governance rules before publishing the generated automation to a production environment.

16. A non-transitory computer-readable medium storing a computer program, the computer program configured to cause at least one processor to:
   download code for a web-based robotic process automation (RPA) designer application to a web browser, the web-based RPA designer application configured to facilitate creation and configuration of RPA workflows by a user, the downloaded code comprising executable binaries for automation functionality;
   load the executable binaries into a tab of the web browser;
   display a web interface for the web-based RPA designer application in the tab of the web browser, the web interface configured to provide functionality for the user to create RPA projects and configure RPA workflows;
   generate an automation for a configured RPA workflow in the web browser; and
   execute and validate the generated automation in the web browser using a browser worker process.

17. The non-transitory computer-readable medium of claim 16, wherein code for executing and validating the generated automation is included in the downloaded code.

18. The non-transitory computer-readable medium of claim 16, wherein the downloaded code is executed as part of a same tab of the web browser as the web interface of the web-based designer application.

19. The non-transitory computer-readable medium of claim 16, wherein the generated automation is configured to be executed at runtime without an RPA robot.

20. The non-transitory computer-readable medium of claim 16, wherein the generated automation is configured to be executed by a production RPA robot at runtime remotely in an operating system session, a virtual machine (VM), or a container.

21. The non-transitory computer-readable medium of claim 16, wherein the generated automation is configured to be executed by a production web browser at runtime remotely in an operating system session, a virtual machine (VM), or a container.

22. The non-transitory computer-readable medium of claim 16, wherein the web-based RPA designer application is configured to prevent users from publishing or running automations with static code analysis errors in accordance with governance rules.

23. The non-transitory computer-readable medium of claim 16, wherein when the generated automation fails validation, the web-based RPA designer application is configured to require correction of validation errors or compliance with governance rules before publishing the generated automation to a production environment.

24. A computer-implemented method, comprising:
   downloading code for a web-based robotic process automation (RPA) designer application to a web browser, by a computing system, the web-based RPA designer application configured to facilitate creation and configuration of RPA workflows by a user, the downloaded code comprising executable binaries for automation functionality;
   loading the executable binaries into a tab of the web browser, by the computing system;
   displaying a web interface for the web-based RPA designer application in the tab of the web browser, by the computing system, the web interface configured to provide functionality for the user to create RPA projects and configure RPA workflows;
   generating an automation for a configured RPA workflow in the web browser, by the computing system; and
   executing and validating the generated automation in the web browser using a browser worker process, by the computing system, wherein
   code for executing and validating the generated automation is included in the downloaded code.

25. The computer-implemented method of claim 24, wherein the downloaded code is executed as part of a same tab of the web browser as the web interface of the web-based designer application.

26. The computer-implemented method of claim 24, wherein the generated automation is configured to be executed at runtime without an RPA robot.

27. The computer-implemented method of claim 24, wherein the generated automation is configured to be executed by a production RPA robot at runtime remotely in an operating system session, a virtual machine (VM), or a container.

28. The computer-implemented method of claim 24, wherein the generated automation is configured to be executed by a production web browser at runtime remotely in an operating system session, a virtual machine (VM), or a container.

29. The computer-implemented method of claim 24, further comprising:
   preventing users from publishing or running automations with static code analysis errors in accordance with governance rules, by the web-based RPA designer application.

30. The computer-implemented method of claim 24, further comprising:
   requiring correction of validation errors or compliance with governance rules before publishing the generated automation to a production environment, by the web-based RPA designer application.

* * * * *